US012590792B2

(12) United States Patent
Morimoto

(10) Patent No.: US 12,590,792 B2
(45) Date of Patent: Mar. 31, 2026

(54) SHEET PROPERTY MEASUREMENT DEVICE AND IMAGE FORMING APPARATUS

(71) Applicant: CANON KABUSHIKI KAISHA, Tokyo (JP)

(72) Inventor: Kazusa Morimoto, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 370 days.

(21) Appl. No.: 18/116,361

(22) Filed: Mar. 2, 2023

(65) Prior Publication Data

US 2023/0280147 A1 Sep. 7, 2023

(30) Foreign Application Priority Data

Mar. 3, 2022 (JP) ................................. 2022-032324

(51) Int. Cl.
*G01B 5/06* (2006.01)
*G01G 9/00* (2006.01)
*G03G 15/00* (2006.01)

(52) U.S. Cl.
CPC ................. *G01B 5/06* (2013.01); *G01G 9/00* (2013.01); *G03G 15/5016* (2013.01)

(58) Field of Classification Search
CPC ......... G01B 5/06; G01G 9/00; G03G 15/5016
USPC ........................................... 33/1 B; 101/368
See application file for complete search history.

(56) References Cited

U.S. PATENT DOCUMENTS

| | | | |
|---|---|---|---|
| 10,416,590 | B2 | 9/2019 | Hashimoto et al. |
| 11,591,174 | B2 | 2/2023 | Izumiya et al. |

| | | | | |
|---|---|---|---|---|
| 2011/0142462 | A1 | 6/2011 | Takada | |
| 2016/0187826 | A1* | 6/2016 | Mamura | ............ G03G 15/5062 |
| | | | | 399/45 |
| 2017/0034378 | A1 | 2/2017 | Hirao | |
| 2017/0261902 | A1* | 9/2017 | Hoshino | .............. G03G 15/553 |
| 2020/0255239 | A1* | 8/2020 | Izumiya | .................. B65H 7/02 |
| 2021/0294257 | A1* | 9/2021 | Takahashi | ......... G03G 15/5062 |
| 2023/0280147 | A1* | 9/2023 | Morimoto | ................ G01B 5/06 |
| | | | | 33/1 B |

(Continued)

FOREIGN PATENT DOCUMENTS

| | | |
|---|---|---|
| CN | 110471265 A | 11/2019 |
| JP | 2015-199578 A | 11/2015 |
| JP | 2017-028647 A | 2/2017 |

(Continued)

OTHER PUBLICATIONS

U.S. Appl. No. 18/128,012, filed Mar. 29, 2023, Kazusa Morimoto.
Office Action dated Jan. 27, 2026, in Japanese Patent Application No. 2022-032324.

*Primary Examiner* — Peter J Macchiarolo
*Assistant Examiner* — Anna Josephine Saunders
(74) *Attorney, Agent, or Firm* — Venable LLP

(57) ABSTRACT

A sheet property measurement device includes an insertion portion into which a sheet is to be inserted, a reading sensor configured to read a surface of the sheet inserted into the insertion portion, and a controller. The controller is configured to measure a property of the surface of the sheet based on a plurality of reading results given by the reading sensor, and output a measurement error in a case where all the plurality of reading results given by the reading sensor do not change from a reading result given at one location on the surface of the sheet with respect to an insertion direction of inserting the sheet.

14 Claims, 16 Drawing Sheets

(56) References Cited

U.S. PATENT DOCUMENTS

2023/0319195 A1 *  10/2023  Morimoto ............ H04N 1/2392
                                                   358/1.12

FOREIGN PATENT DOCUMENTS

| | | |
|---|---|---|
| JP | 2017-102225 A | 6/2017 |
| JP | 2018-024177 A | 2/2018 |
| JP | 2020-066478 A | 4/2020 |
| JP | 2020-123835 A | 8/2020 |

* cited by examiner

START

CLASSIFICATION BASED
ON SURFACE PROPERTY ⟩S21

CLASSIFICATION BASED
ON BASIS WEIGHT ⟩S22

CLASSIFICATION BASED
ON SHEET THICKNESS ⟩S23

DETERMINE SHEET TYPE ⟩S24

END

ADJACENT PIXEL
DIFFERENCE
INTEGRATED VALUE

EMBOSSED PAPER SHEET

RECYCLED PAPER SHEET

PLAIN PAPER SHEET

TRANSPARENT
FILM

COATED PAPER SHEET

BRIGHTNESS

| SHEET BRAND | TYPE | BASIS WEIGHT [gsm] | ALLOW SHEET PASSAGE OR NOT | LIMITATION OF FIBER ORIENTATION | SHEET-FEEDABLE PORT | FIXING SPEED [mm/s] | … |
|---|---|---|---|---|---|---|---|
| THIN PAPER SHEET A | THIN PAPER SHEET | 58 | NOT ALLOWED | — | — | — | … |
| THIN PAPER SHEET B | THIN PAPER SHEET | 60 | ALLOWED | NO LIMITATION | ALL | 300 | … |
| HIGH-QUALITY PAPER SHEET A | PLAIN PAPER SHEET | 64 | ALLOWED | NO LIMITATION | ALL | 300 | … |
| HIGH-QUALITY PAPER SHEET B | PLAIN PAPER SHEET | 81 | ALLOWED | NO LIMITATION | ALL | 300 | … |
| HIGH-QUALITY PAPER SHEET C | PLAIN PAPER SHEET | 157 | ALLOWED | NO LIMITATION | ALL | 300 | … |
| THICK PAPER SHEET A | THICK PAPER SHEET | 250 | ALLOWED | NO LIMITATION | ALL | 150 | … |
| THICK PAPER SHEET B | THICK PAPER SHEET | 270 | ALLOWED | NO LIMITATION | ONLY MANUAL FEEDING | 150 | … |
| THICK PAPER SHEET C | THICK PAPER SHEET | 300 | ALLOWED | LIMITED TO LATERAL | ONLY MANUAL FEEDING | 150 | … |
| THICK PAPER SHEET D | THICK PAPER SHEET | 350 | NOT ALLOWED | — | — | — | … |
| COATED PAPER SHEET A | COATED PAPER SHEET | 104 | ALLOWED | NO LIMITATION | ONLY MANUAL FEEDING | 150 | … |
| COATED PAPER SHEET B | COATED PAPER SHEET | 128 | ALLOWED | NO LIMITATION | ONLY MANUAL FEEDING | 150 | … |
| SYNTHETIC PAPER SHEET A | SYNTHETIC PAPER SHEET | 128 | NOT ALLOWED | — | — | — | … |
| … | … | … | … | … | … | … | … |

FIG. 19

| SHEET BRAND NAME | BASIS WEIGHT [gsm] | ADJACENT PIXEL DIFFERENCE INTEGRATED VALUE | BRIGHTNESS | SHEET THICKNESS [μm] | SHEET CLASSIFICATION |
|---|---|---|---|---|---|
| AAAAA | 52 | 2600 | 43000 | 67 | THIN PAPER SHEET |
| … | … | … | … | … | … |
| BBBBB | 68 | 3000 | 50000 | 92 | PLAIN PAPER SHEET 1 |
| … | … | … | … | … | … |
| CCCCC | 81.4 | 2000 | 50000 | 97 | PLAIN PAPER SHEET 2 |
| … | … | … | … | … | … |
| DDDDD | 128 | 1500 | 46000 | 140 | COATED PAPER SHEET 1 |
| EEEEE | 209 | 10000 | 60000 | 210 | COATED PAPER SHEET 2 |
| … | … | … | … | … | … |

FIG. 20

SHEET PROPERTY MEASUREMENT DEVICE AND IMAGE FORMING APPARATUS

BACKGROUND OF THE INVENTION

Field of the Invention

The present disclosure relates to a sheet property measurement device for measuring a property of a surface of a sheet, and an image forming apparatus.

Description of the Related Art

An electrophotographic image forming apparatus such as a copying machine, a printer, a facsimile machine, or a multifunction peripheral forms an image on a sheet being conveyed on a conveyance path by steps of charging, exposing with light, developing, transferring, and fixing. There are various types of sheets usable for image formation. Sheets are different in property (physical property), such as sheet thickness, smoothness, basis weight, and surface property, depending on a type of sheet. Optimum image forming conditions in the steps of image formation differ depending on physical properties (for example, stiffness, basis weight, and surface property) of a sheet to be used. Thus, an image forming apparatus is required to control the image forming conditions based on a type of sheet. At the time of using an image forming apparatus, a user sets in advance a type of the sheet to be used. However, when the type of sheet is incorrectly set, the image forming apparatus cannot form an image with appropriate image forming conditions. In this case, a normal image is not formed on a sheet. For example, the image formed on the sheet may have abnormality due to, for example, occurrence of jam, failure in fixing, or inadequate image density.

In Japanese Patent Application Laid-open No. 2020-123835, there is disclosed an image forming apparatus which specifies a type of sheet with a measuring device (media sensor) for measuring feature amounts of a sheet and then performs image formation. The measuring device notifies the image forming apparatus of a measurement result of the sheet. The image forming apparatus refers to a plurality of sheet profiles registered in advance to detect a sheet profile matching the measurement result, and displays the sheet profile on a display unit. In this way, incorrect setting of a type of sheet is reduced.

A sheet is not uniform in feature amount, for example, surface property, and there is unevenness on a sheet surface depending on locations. Thus, a reading result of a sheet given at one location may result in poor identification accuracy for a type of sheet. In order to read as wide a region of a sheet surface as possible, the measuring device is required to read the moving sheet surface a plurality of times. In a case of reading a sheet surface of a sheet that is manually inserted by a person, the sheet may not be moving in an entire period or a certain period of measurement timing. In this case, the sheet surface is not read a plurality of times, with the result that the identification accuracy may be poor.

SUMMARY OF THE INVENTION

A sheet property measurement device according to the present disclosure includes an insertion portion into which a sheet is to be inserted; a reading sensor configured to read a surface of the sheet inserted into the insertion portion; and a controller configured to measure a property of the surface of the sheet based on a plurality of reading results given by the reading sensor; and output a measurement error in a case where all the plurality of reading results given by the reading sensor do not change from a reading result given at one location on the surface of the sheet with respect to an insertion direction of inserting the sheet.

Further, an image forming apparatus for forming an image on a sheet based on image forming conditions includes an insertion portion into which a sheet is to be inserted; a reading sensor configured to read a surface of the sheet inserted into the insertion portion; a display; and a controller configured to control the display so as to display candidates of a plurality of types of the sheet based on a plurality of reading results given by the reading sensor; control an acquisition unit configured to acquire user instruction information related to a type of the sheet selected from the candidates displayed on the display; control the image forming conditions based on the user instruction information acquired by the acquisition unit; and control the display so as to display a measurement error in a case where all the plurality of reading results given by the reading sensor do not change from the reading result given at one location on the surface of the sheet with respect to an insertion direction of inserting the sheet.

Further features of the present invention will become apparent from the following description of exemplary embodiments (with reference to the attached drawings).

BRIEF DESCRIPTION OF THE DRAWINGS

FIG. 19 is an illustrative table of a sheet type database.

FIG. 20 is an illustrative table of a sheet type database.

DESCRIPTION OF THE EMBODIMENTS

A preferred embodiment of the present disclosure is illustratively described in detail below with reference to the drawings.

Image Forming Apparatus

Figure 1:
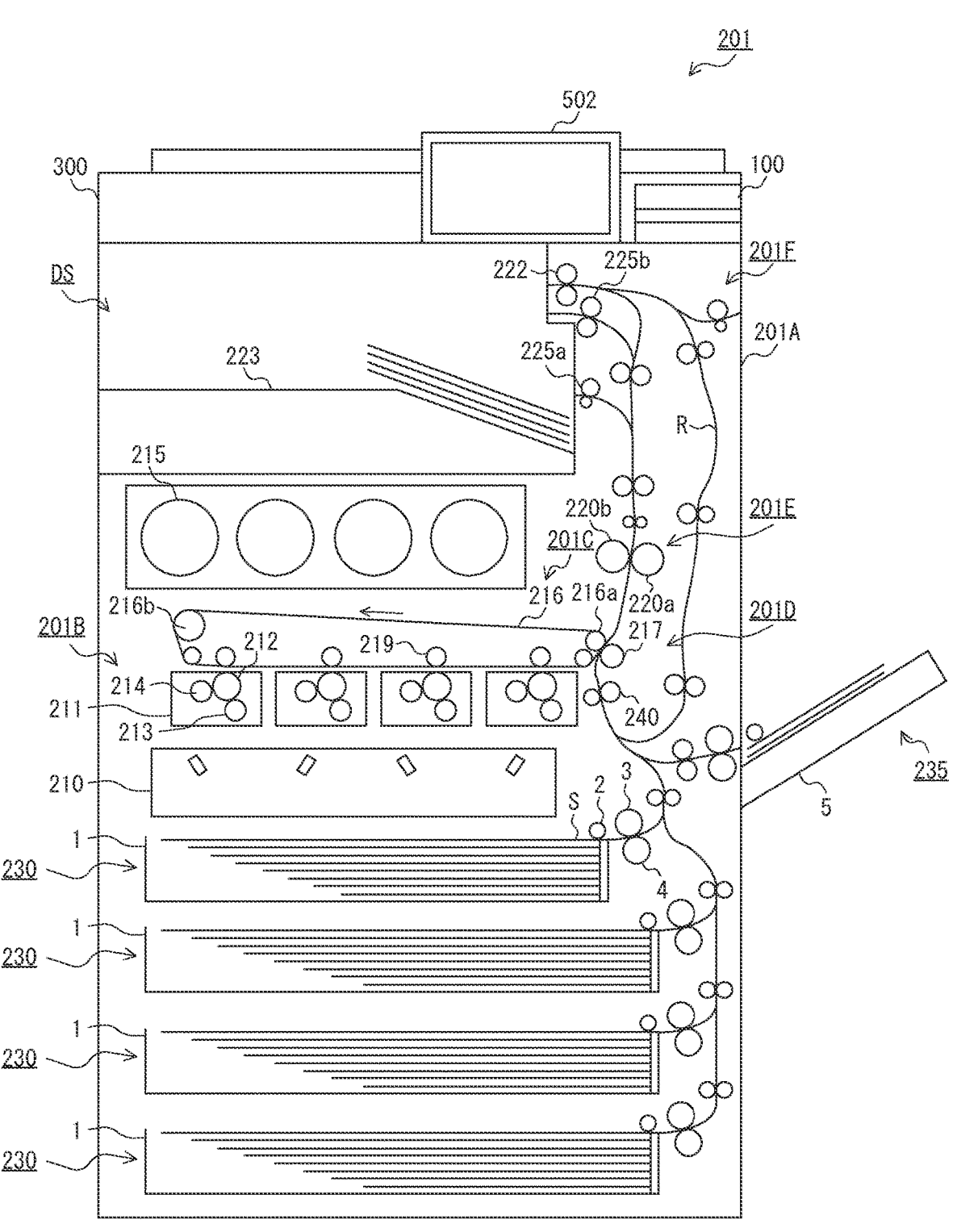
FIG. 1 is a configuration view of an image forming apparatus.

FIG. 1 is a configuration view of an image forming apparatus according to this embodiment. An image forming apparatus 201 according to this embodiment is, for example, a laser beam printer of a tandem intermediate-transfer type using an electrophotographic process. The image forming apparatus 201 forms a full color image or a monochrome image on a sheet S and outputs the sheet S based on image data acquired from an external device, for example, a personal computer via a network or based on image data acquired from an image reading device 300.

The image forming apparatus 201 has, inside a main body 201A, components for forming an image, and includes, on the top of the main body 201A, an image reading device 300, an operation unit 502, and a sheet property measurement device 100. A delivery space DS for receiving the sheet S to be delivered thereinto after image formation is defined between the main body 201A of the image forming apparatus 201 and the image reading device 300.

The image reading device 300 is a scanner which reads an image from an original and generates image data. The image reading device 300 is used, for example, at the time of processing of copying an original. The operation unit 502 is a user interface including an input interface and an output interface. Examples of the input interface include various key buttons and a touch panel. Examples of the output interface include a display and a speaker. A user can input various instructions to the image forming apparatus 201 via the operation unit 502. The sheet property measurement device 100 measures a property of a surface of the sheet S that is used by the image forming apparatus 201 for image formation (printing). Details of the sheet property measurement device 100 are described later.

The image forming apparatus 201 includes, in the main body 201A, an image forming unit 201B, an intermediate transfer unit 201C, a secondary transfer unit 201D, a fixing device 201E, and cassette sheet-feeding units 230.

The cassette sheet-feeding units 230 each feed sheets S from a corresponding one of sheet-feeding cassettes 1 accommodating the sheets S. The cassette sheet-feeding unit 230 includes a pickup roller 2 and a separation unit. The separation unit includes a feed roller 3 and a retard roller 4 for separating sheets S sent out from the pickup roller 2. The sheets S are fed one by one from the sheet-feeding cassette 1 by the pickup roller 2 and the separation unit. In this embodiment, description is made of a configuration in which a plurality of (in this example, four) cassette sheet-feeding units 230 are provided. However, any number of cassette sheet-feeding units 230 may be provided. The sheet S fed from the cassette sheet-feeding unit 230 is conveyed to a registration roller pair 240 along a conveyance path.

The sheet S can be fed from a unit other than the cassette sheet-feeding unit 230, that is, from a manual sheet-feeding unit 235. The manual sheet-feeding unit 235 includes a manual feeding tray 5 for receiving sheets placed by a user. Similar to the cassette sheet-feeding unit 230, the manual sheet-feeding unit 235 includes a pickup roller and a separation unit, and sheets S are fed one by one from the manual feeding tray 5. The sheet S fed from the manual sheet-feeding unit 235 is also conveyed to the registration roller pair 240 along a conveyance path.

The image forming unit 201B is of a four-drum full-color type, and includes a laser scanner 210 and four process cartridges 211. The four process cartridges 211 form toner images of four colors, specifically, yellow (Y), magenta (M), cyan (C), and black (K). Each process cartridge 211 includes a photosensitive drum 212, a charging device 213, and a developing device 214. Toner cartridges 215 are arranged above the process cartridges 211. The toner cartridges 215 supply toner to the respective developing devices 214.

The intermediate transfer unit 201C includes an intermediate transfer belt 216 wound around a drive roller 216a and a tension roller 216b. On an inner side of the intermediate transfer belt 216, there are provided four primary transfer rollers 219 which are in abutment against the intermediate transfer belt 216 at positions opposing the photosensitive drums 212. The intermediate transfer belt 216 is rotated in the arrow direction by the drive roller 216a driven by a drive unit (not shown).

The secondary transfer unit 201D includes a secondary transfer roller 217 provided so as to sandwich the intermediate transfer belt 216 at a position opposing the drive roller 216a. The fixing device 201E is provided on a downstream side of the secondary transfer roller 217 in a conveyance direction of the sheet S, and includes a pressure roller 220a and a heating roller 220b. On a downstream side of the fixing device 201E in the conveyance direction of the sheet S, there are arranged a first delivery roller pair 225a, a second delivery roller pair 225b, and a duplex-printing reversing unit 201F. The duplex-printing reversing unit 201F includes a reversing roller pair 222 and a re-conveyance passage R. The reversing roller pair 222 is rotatable in forward and reverse directions. The re-conveyance passage R allows the sheet S having an image formed on one side thereof to be conveyed again to the image forming unit 201B.

The image forming apparatus 201 having the configuration as described above operates as follows. The image forming apparatus 201 acquires image data from the image reading device 300 or from an external device and forms an image corresponding to the image data on the sheet S. At this time, the image forming apparatus 201 performs the steps of image formation with image forming conditions given in accordance with a type of the sheet S.

The image forming unit 201B uses the charging device 213 to uniformly charge surfaces of the photosensitive drums 212 to an electric potential having a predetermined polarity. The laser scanner 210 irradiates the uniformly charged surfaces of the photosensitive drums 212 with corresponding laser beams modulated based on the image data. In this way, electrostatic latent images for corresponding colors (yellow, magenta, cyan, and black) are formed on the respective surfaces of the photosensitive drums 212.

The image forming unit 201B uses the developing devices 214 to develop the electrostatic latent images formed on the photosensitive drums 212. The electrostatic latent images are developed on the photosensitive drums 212 with toners of corresponding colors so that toner images of the corresponding colors are formed on the photosensitive drums 212. The toner images are sequentially transferred from the photosensitive drums 212 to the rotating intermediate transfer belt 216 in superimposition by the primary transfer rollers 219. In this way, a full-color toner image is formed on the intermediate transfer belt 216. The intermediate transfer belt 216 rotates to convey the toner image to the secondary transfer unit 201D.

Concurrently with such operation of forming a toner image, the sheets S are conveyed one by one by the cassette sheet-feeding unit 230 or the manual sheet-feeding unit 235 to the registration roller pair 240. The registration roller pair 240 corrects skew of the sheet S conveyed to the registration roller pair 240. After the skew is corrected, the sheet S is conveyed by the registration roller pair 240 to the secondary transfer unit 201D in synchronization with the timing at which the toner image borne on the intermediate transfer belt 216 is conveyed to the secondary transfer unit 201D. The secondary transfer unit 201D transfers the full-color toner image from the intermediate transfer belt 216 onto the sheet S with secondary transfer bias applied to the secondary transfer roller 217.

The sheet S having the toner image transferred thereto is conveyed to the fixing device 201E. The fixing device 201E sandwiches and conveys the sheet S with a roller nip portion defined by the pressure roller 220a and the heating roller 220b. The fixing device 201E heats the sheet S with the heating roller 220b at the time of sandwiching and conveying the sheet S, to thereby melt and mix the toners of respective colors on the sheet S. Further, the fixing device 201E presses the sheet S with the pressure roller 220a, to thereby fix the melted and mixed toners to the sheet S. At this time, the viscosity of the melted toner generates a sticking force to the heating roller 220b on the sheet S.

Figure 2A:
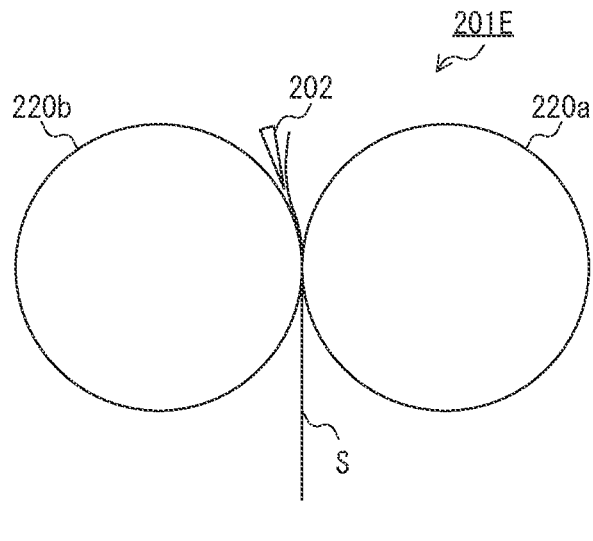
FIG. 2A and FIG. 2B are enlarged views of a fixing device (201).
Figure 2B:
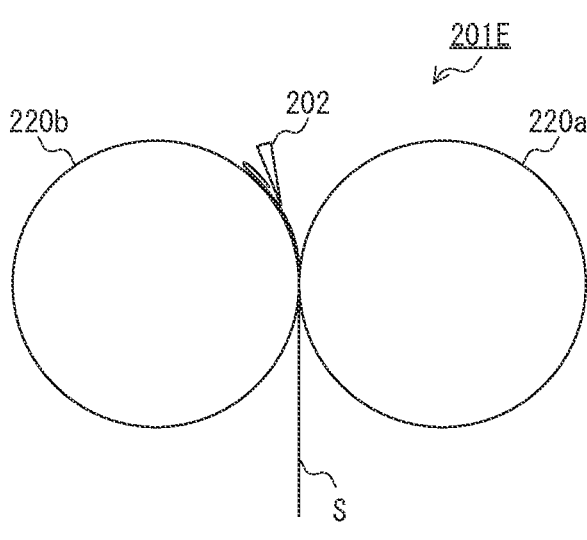

FIG. 2A and FIG. 2B are enlarged views of the fixing device 201E. When the stiffness (strength) of the sheet S is small, the sticking force to the heating roller 220b generated on the sheet S may cause the sheet S to be rolled up by the heating roller 220b being rotated (FIG. 2B). Thus, a separation plate 202 which separates the sheet S is provided on a downstream side of the heating roller 220b in the conveyance direction of the sheet S (FIG. 2A).

The image forming apparatus 201 may determine a state of the separation plate 202 in accordance with a type of the sheet S. For example, when the sheet S of a type having a small stiffness is subjected to image formation, the separation plate 202 is arranged such that a distal end of the separation plate 202 is in contact with a surface of the heating roller 220b as illustrated in FIG. 2A, to thereby separate the sheet S from the heating roller 220b. When the sheet S of a type having a large stiffness is subjected to image formation, the sheet S is not rolled up by the heating roller 220b. Thus, the separation plate 202 is arranged such that the distal end of the separation plate 202 is not in contact with the surface of the heating roller 220b. In this way, the surface of the heating roller 220b can be prevented from being worn by the separation plate 202.

The sheet S having the image fixed thereto is delivered to the delivery space DS by any one of the first delivery roller pair 225a or the second delivery roller pair 225b. The sheet S is placed on a placement portion 223 provided in a protruding manner on a bottom surface of the delivery space DS. When images are formed on both sides of the sheet S, the sheet S having an image fixed on one side thereof is conveyed by a reversing roller pair 222 to the re-conveyance passage R. The sheet S is conveyed again to the image forming unit 201B, and an image is formed on another side of the reversed sheet S.

Controller

Figure 3:
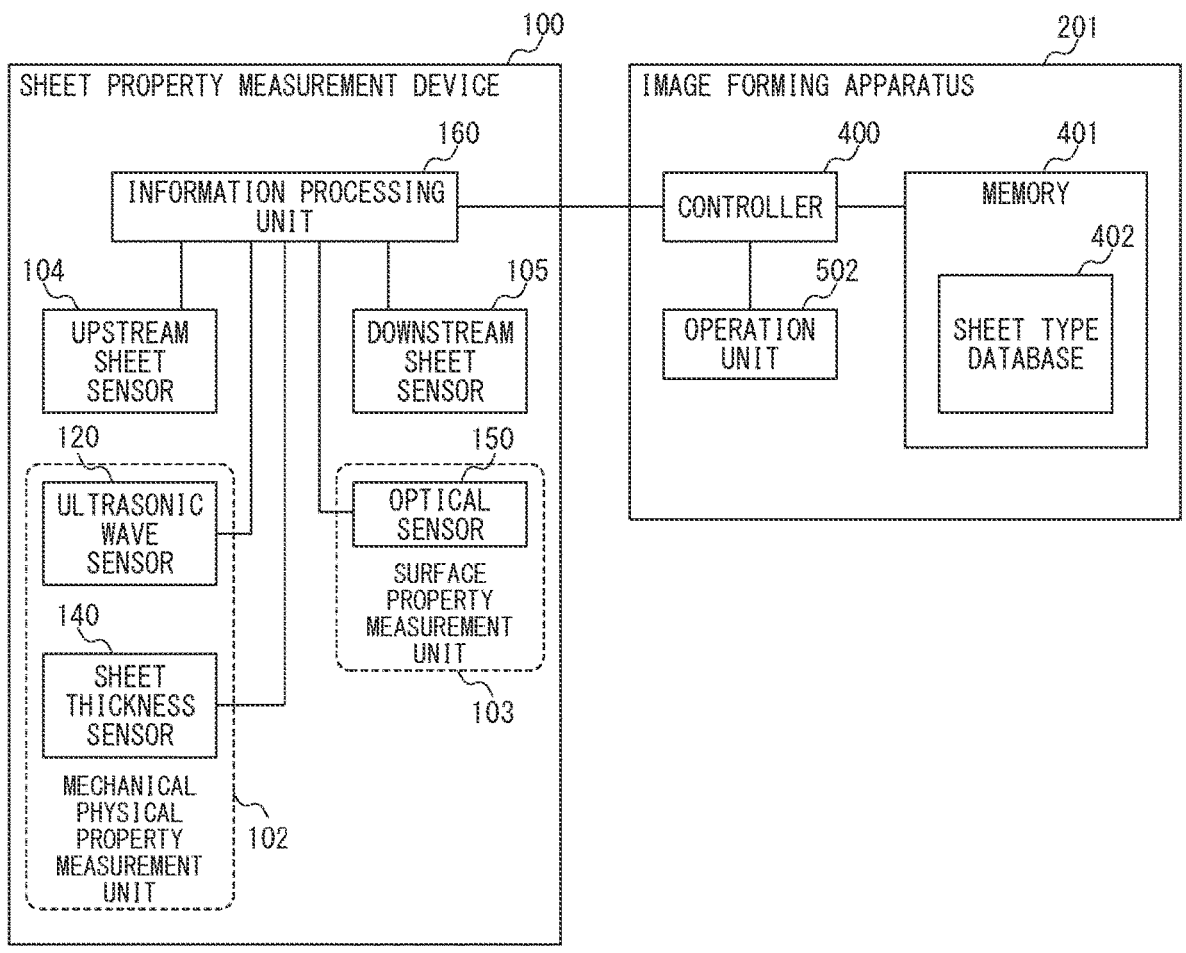
FIG. 3 is an explanatory diagram of a controller.

FIG. 3 is an explanatory diagram of a controller which controls operation of such image forming apparatus 201. A controller 400 is, for example, an information processing device including a central processing unit (CPU). The controller 400 may be achieved by, for example, a microprocessor unit (MPU) or an application specific integrated circuit (ASIC). The controller 400 controls the abovementioned image forming processing performed by the image forming apparatus 201. Further, in this embodiment, the controller 400 is connected to the sheet property measurement device 100 and controls the sheet property measurement device 100. A memory 401 and the operation unit 502 are connected to the controller 400. The memory 401 includes a sheet type database 402. The sheet type database 402 stores pieces of information such as physical property values of various brands of sheets, optimum parameters of image forming conditions for components to be applied at the time of image formation, whether or not to allow passage of sheets in the image forming apparatus 201, and usable sheet feeding ports.

The sheet property measurement device 100 includes an information processing unit 160. The information processing unit 160 is an information processing device achieved by, for example, a CPU, an MPU, or an ASIC. The information processing unit 160 is communicably connected to the controller 400 and can operate in cooperation with the controller 400. The information processing unit 160 has an upstream sheet sensor 104, a downstream sheet sensor 105, a mechanical physical property measurement unit 102, and a surface property measurement unit 103 connected thereto. The mechanical physical property measurement unit 102 includes an ultrasonic wave sensor 120 and a sheet thickness sensor 140. The surface property measurement unit 103 includes an optical sensor 150. The information processing unit 160 controls operations of the upstream sheet sensor 104, the downstream sheet sensor 105, the mechanical physical property measurement unit 102, and the surface property measurement unit 103 and acquires respective measurement results.

The upstream sheet sensor 104 is a sensor which detects insertion of the sheet S into the sheet property measurement device 100. The information processing unit 160 starts a measurement sequence for feature amounts of the sheet S upon detection of the sheet S by the upstream sheet sensor 104. The downstream sheet sensor 105 is a sensor which detects arrival of the sheet S at the innermost portion (abutment portion described later) inside the sheet property measurement device 100 to which the sheet S can be inserted. The ultrasonic wave sensor 120 is a sensor used for measuring a basis weight of the sheet S. The sheet thickness sensor 140 is a sensor used for measuring a sheet thickness of the sheet S. The optical sensor 150 reads a surface of the sheet S. The optical sensor 150 is a reading sensor used for measuring adjacent pixel difference integrated values and surface property information (property of the surface of the sheet S), for example, brightness of the sheet S. The adjacent pixel difference integrated values are each a value obtained by integrating a difference between detection values (measurement results) of pixels adjacent to each other in a direction along one line of measurement by the optical sensor 150. The optical sensor 150 outputs luminance values of pixels as measurement results. The information processing unit 160 stores the measurement results and generates surface property information based on the measurement results. Details of the ultrasonic wave sensor 120, the sheet thickness sensor 140, and the optical sensor 150 are described later.

The information processing unit 160 transmits mechanical physical property information (basis weight and sheet thickness) acquired by the mechanical physical property measurement unit 102 and surface property information (property of surface of sheet S) acquired by the surface property measurement unit 103 to the controller 400. The controller 400 determines a sheet type of the sheet S based on the acquired surface property information. After that, the controller 400 refers to the sheet type database 402 to specify candidates of brands of the sheet S based on the sheet type and the mechanical physical property information (basis weight and sheet thickness) and displays the candidates on a display of the operation unit 502.

Type of Sheet Used in Image Forming Apparatus

Image forming conditions given at the time of image forming processing (for example, conveyance speed and fixing temperature given at the time of fixing, and transfer voltage given at the time of secondary transfer) differ depending on physical properties, such as a basis weight, a stiffness, a surface property, and a material, of the sheet S subjected to image formation. Thus, it is important to grasp in advance a type of the sheet S to be used at the time of image formation.

There may be some limitations in setting the sheet S to a sheet feeding port. The sheet feeding port is the sheet-feeding cassette 1 or the manual feeding tray 5. For example, some thick paper sheets having a high stiffness can be fed only from the manual feeding tray 5 with a conveyance path having a small curvature. Coated paper sheets having a smooth surface texture and a strong adhesion between sheets are required to be fed one by one from the manual feeding tray 5. Paper sheets made of pulp as a raw material generally have different bending stiffnesses in length and width directions because of bias in orientation directions of pulp fibers (fiber orientation) that occurs due to a manufacturing method. Thus, for some paper sheets made of pulp as a raw material, there is given a recommended orientation of the sheet in length and width directions at the time of setting the sheet to the sheet feeding port so that the bending stiffness against the bending in the conveyance path becomes smaller. Further, for one-side coated paper sheets obtained by coating only one side of a plain paper sheet, an orientation in up-and-down directions is designated at the time of setting in order to perform image formation on the coated side.

There are also some sheets which cannot be used in the image forming apparatus 201. For example, in a case of a thick paper sheet having an excessively high stiffness, conveyance of the sheet may be stopped due to resistance generated at the time of conveying the sheet along a bent conveyance path. A thin paper sheet having an excessively low stiffness is strongly affected by the sticking force generated between the melted toner and the heating roller 220b at the time of passage through the fixing device 201E as described above. Thus, there is a possibility that a paper sheet having an excessively low stiffness is not separated from the heating roller 220b by the separation plate 202 and is directly wound around the heating roller 220b (FIG. 2B). Further, in a case of a synthetic paper sheet which is not made of pulp but of a synthetic resin as a raw material, there is a possibility that the sheet is melted by heating in the fixing device 201E, thereby contaminating the heating roller 220b.

Sheet Property Measurement Device

FIG. 4A, FIG. 4B, FIG. 5A, FIG. 5B, and FIG. 6 are explanatory views of the sheet property measurement device

Figure 4A:
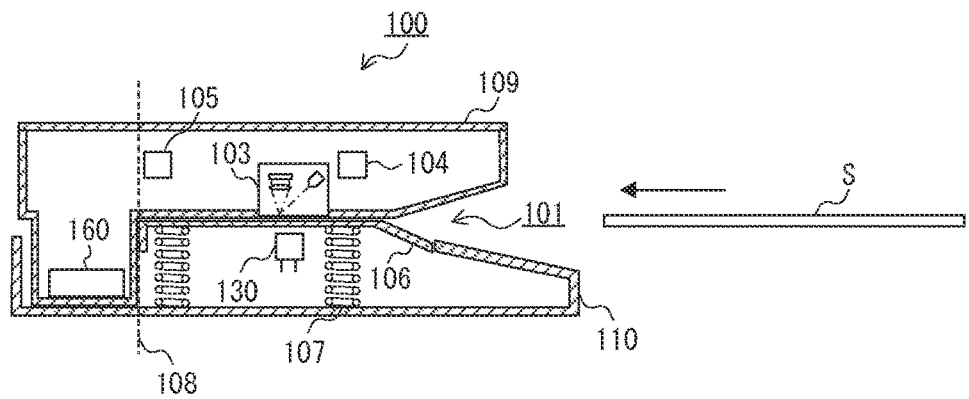
FIG. 4A and FIG. 4B are explanatory views of a sheet property measurement device.
Figure 4B:
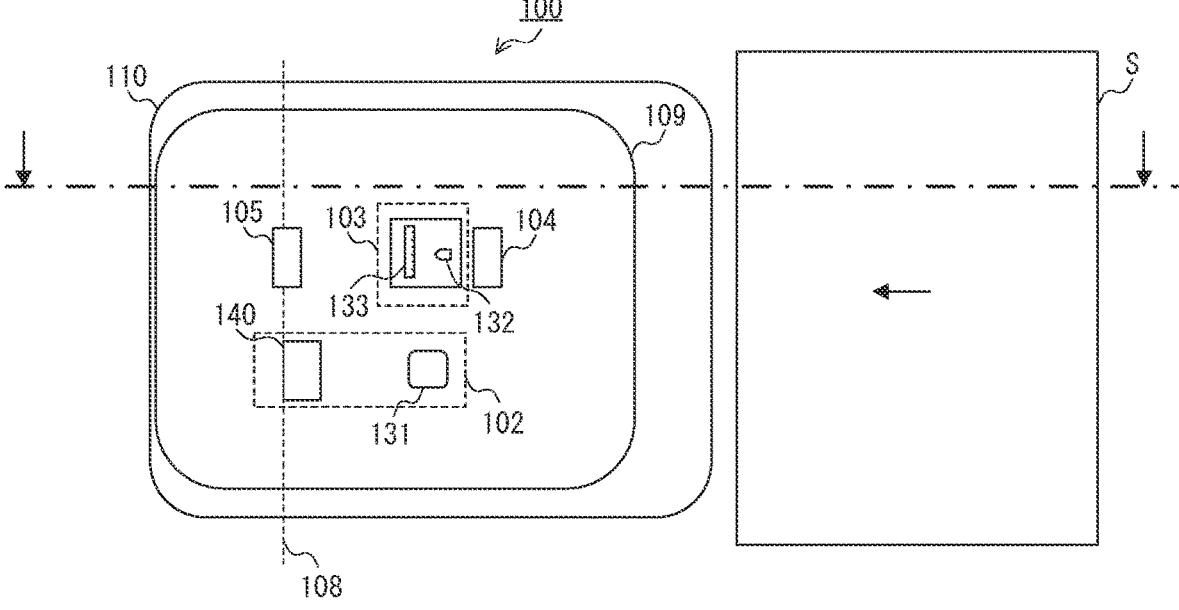
Figure 5A:
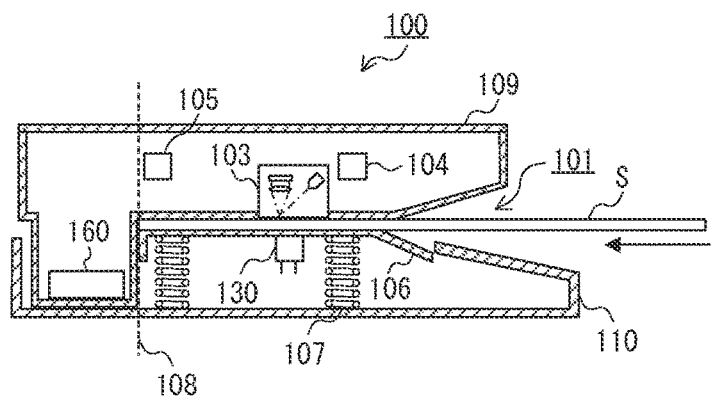
FIG. 5A and FIG. 5B are explanatory views of the sheet property measurement device.
Figure 5B:
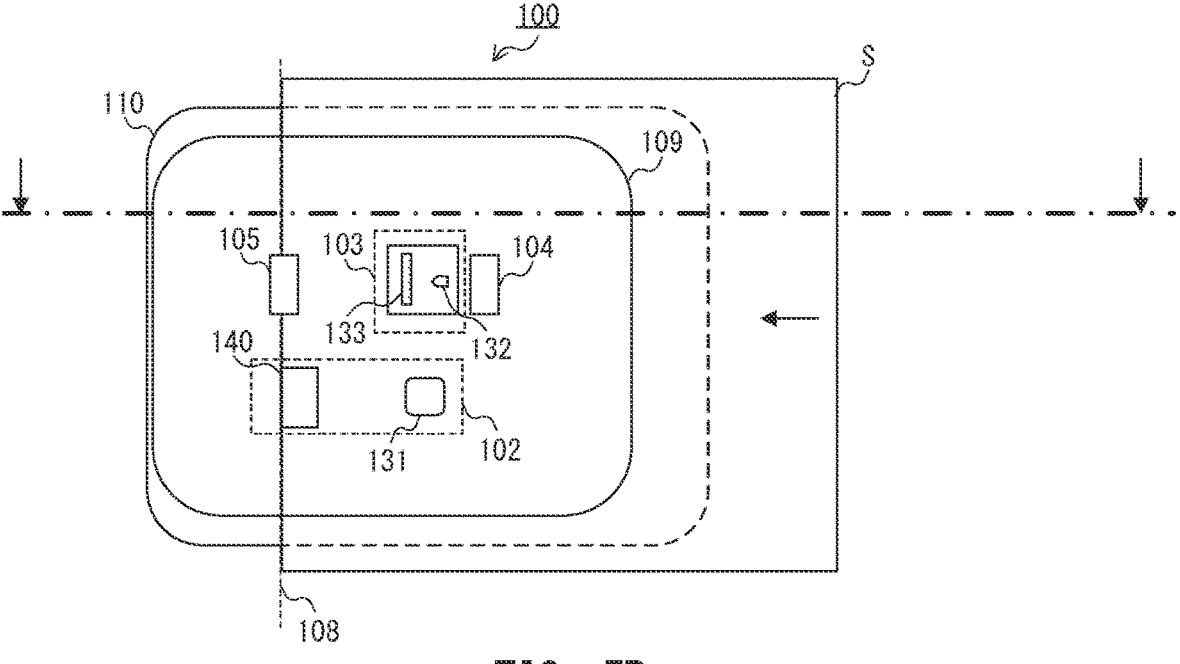
Figure 6:
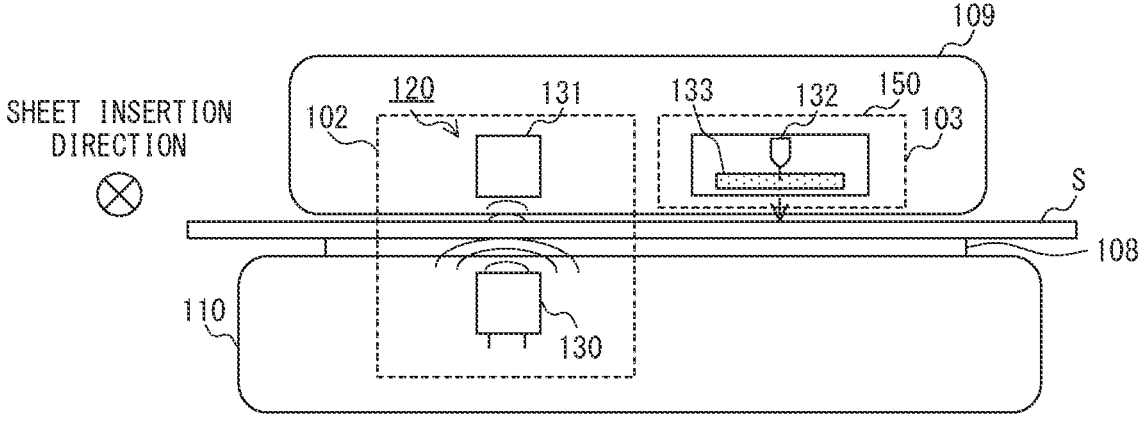
FIG. 6 is an explanatory view of the sheet property measurement device.

100, FIG. 4A and FIG. 4B show a state before the sheet S is inserted into the sheet property measurement device 100. FIG. 5A and FIG. 5B show a state in which the sheet S has been inserted into the sheet property measurement device 100. FIG. 4A and FIG. 5A are views of the sheet property measurement device 100 as seen from a lateral side (front side of the image forming apparatus 201 of FIG. 1). FIG. 4B and FIG. 5B are views of the sheet property measurement device 100 as seen from an upper side. FIG. 6 is a view of the sheet property measurement device 100 as seen in an insertion direction of the sheet S.

The sheet property measurement device 100 has a groove portion 101 into which the sheet S subjected to identification is to be inserted, and measures physical property values of the sheet S inserted from the groove portion 101. The insertion of the sheet S is performed manually by a user. The groove portion 101 includes an upper block 109 in an upper part and a lower block 110 in a lower part.

On a groove-portion inner side of the lower block 110, a sheet pressing member 106 is provided. The sheet pressing member 106 is urged by an urging member 107 toward the upper block 109 side. The sheet S is inserted while pushing away the sheet pressing member 106 downward. The upper block 109 projects at an end portion of the sheet pressing member 106 (innermost portion to which the sheet S can be inserted) toward the lower block 110 side, thereby forming an abutment portion 108. The abutment portion 108 restricts the insertion of the sheet S. Thus, the sheet S can be inserted to the abutment portion 108. The information processing unit 160 is arranged on an inner side beyond the abutment portion 108.

The measurement unit for the physical property values of the sheet S includes the mechanical physical property measurement unit 102 and the surface property measurement unit 103 as described above. As the sheet S passes through the measurement unit, physical property values of the sheet S, such as a basis weight, a surface property, and a sheet thickness, are acquired. The upstream sheet sensor 104 is arranged on an upstream side of the surface property measurement unit 103 in the insertion direction of the sheet S. The downstream sheet sensor 105 is arranged in the vicinity of the abutment portion 108 on the upstream side in the insertion direction of the sheet S. That is, the upstream sheet sensor 104 is arranged at an insertion start position of the sheet S, and the downstream sheet sensor 105 is arranged at an insertion end position of the sheet S. The upstream sheet sensor 104 and the downstream sheet sensor 105 each detect the inserted sheet S.

In the mechanical physical property measurement unit 102, as illustrated in FIG. 6, there are provided an ultrasonic wave emitter 130 on the lower block 110 side and an ultrasonic wave receiver 131 on the upper block 109 side such that the ultrasonic wave emitter 130 and the ultrasonic wave receiver 131 are arranged across an insertion passage along which the sheet S is to be inserted. The ultrasonic wave emitter 130 and the ultrasonic wave receiver 131 form the ultrasonic wave sensor 120. The mechanical physical property measurement unit 102 transmits and receives ultrasonic waves with the ultrasonic wave sensor 120 via the insertion passage of the sheet S, thereby being capable of detecting a basis weight of the sheet S. The basis weight is a mass of the sheet S per unit area, and is represented by a unit "gsm."

The ultrasonic wave emitter 130 and the ultrasonic wave receiver 131 are each formed of a piezoelectric element (also referred to as "piezo element"), which is an element for mutual conversion between a mechanical displacement and an electric signal, and an electrode terminal. The ultrasonic wave emitter 130 generates ultrasonic waves through oscillation of the piezoelectric element in response to input of a pulse voltage having a predetermined frequency to the electrode terminal. The generated ultrasonic waves propagate through air. Upon arrival of the ultrasonic waves to the sheet S, the ultrasonic waves cause the sheet S to vibrate. The ultrasonic waves generated in the ultrasonic wave emitter 130 propagate to the ultrasonic wave receiver 131 via the sheet S. The piezoelectric element of the ultrasonic wave receiver 131 causes the electrode terminal to generate an output voltage corresponding to an amplitude of the received ultrasonic waves. The output voltage has a voltage value corresponding to the basis weight of the sheet S. The output voltage is transmitted as a measurement value to the information processing unit 160.

As compared to a case in which the sheet S is absent between the ultrasonic wave emitter 130 and the ultrasonic wave receiver 131, the output voltage generated by the ultrasonic waves transmitted via the sheet S is reduced. The information processing unit 160 calculates a transmittance of the sheet S in accordance with a ratio of an output voltage given in the presence of the sheet S and an output voltage given in the absence of the sheet S. The transmittance of the ultrasonic waves varies depending on a thickness of the sheet S. Thus, the information processing unit 160 can estimate the basis weight of the sheet S with a conversion formula for an ultrasonic wave transmittance coefficient and a basis weight. In this way, the basis weight of the sheet S is detected with the ultrasonic wave sensor 120.

The upstream sheet sensor 104 which is provided in the upper block 109 and located on the upstream side of the surface property measurement unit 103 in the insertion direction of the sheet S detects insertion of the sheet S into the sheet property measurement device 100. The downstream sheet sensor 105 which is provided in the upper block 109 and located on the downstream side of the surface property measurement unit 103 in the insertion direction of the sheet S detects arrival of the sheet S at the abutment portion 108 against which the sheet S having been completely inserted abuts.

The sheet thickness sensor 140 is arranged near the abutment portion 108. The sheet thickness sensor 140 is of a lever type. In the sheet thickness sensor 140, a lever tilts in accordance with a thickness of the sheet S so that an encoder coordinating with the lever rotates in accordance with the tilting amount of the lever. During rotation of the encoder, the sheet thickness sensor 140 transmits a pulse signal as a measurement value of the sheet thickness to the information processing unit 160. The sheet thickness sensor 140 is arranged somewhat on the downstream side in the insertion direction of the sheet S with respect to the downstream sheet sensor 105 so that the sheet thickness can be measured upon detection of the sheet S by the downstream sheet sensor 105.

As described above, the surface property measurement unit 103 includes the optical sensor 150 for detecting the surface property of the sheet S. The optical sensor 150 includes a light emitter 132 and a line sensor 133. The optical sensor 150 is, for example, a contact image sensor (CIS). The light emitter 132 is, for example, a light emitted diode (LED). The line sensor 133 is formed of an array of a plurality of light receiving elements. For example, the line sensor 133 may be a CMOS line sensor including CMOS sensors as light receiving elements.

As illustrated in FIG. 6, the surface property measurement unit 103 (optical sensor 150) includes the light emitter 132 and the line sensor 133 on the upper block 109 side. The line sensor 133 includes the plurality of light receiving elements arrayed in a direction orthogonal to the insertion direction of the sheet S in the sheet property measurement device 100. Thus, the line sensor 133 reads a surface of the sheet S along one line in a direction crossing the insertion direction of the sheet S. The line sensor 133 is capable of reading a sheet surface region with a resolution corresponding to a pixel size and an imaging magnification of an optical system.

A light amount of reflected light from the sheet S received by the line sensor 133 varies depending on a surface property of sheet S. For example, a surface of a glossy paper sheet has a higher smoothness (less irregularities) than that of a plain paper sheet. Thus, the glossy paper sheet exhibits a larger light amount of specularly reflected light than that of the plain paper sheet, and exhibits a smaller light amount of scattered reflected light (diffused light). That is, the reflected light amount substantially indicates the smoothness of the surface of the sheet S. With use of the specularly reflected light amount, the scattered reflected light amount, or both of the specularly reflected light amount and the scattered reflected light amount of the reflected light from the sheet S received by the line sensor 133 as described above, a type of the sheet S can be distinguished.

The line sensor 133 is configured to perform sampling of the reflected light based on a clock signal having a predetermined sampling frequency. In a surface property measurement method for the sheet S with use of the surface property measurement unit 103 in this embodiment, a plurality of sampling results are used. Details are described later.

The surface property measurement unit 103 is required to hold the sheet S at an optical focus position. Thus, the urging member 107 urges the sheet S toward the surface property measurement unit 103 side, and the sheet pressing member 106 stabilizes a posture of the sheet S. In this way, variation in position and posture of the sheet S at the time of reading the surface of the sheet S is reduced, and hence the surface property measurement unit 103 can stably perform measurement of the surface property. The urging member 107 is set so as to press the inserted sheet S toward the surface property measurement unit 103 side with a force of about 100 gf.

Figure 7:
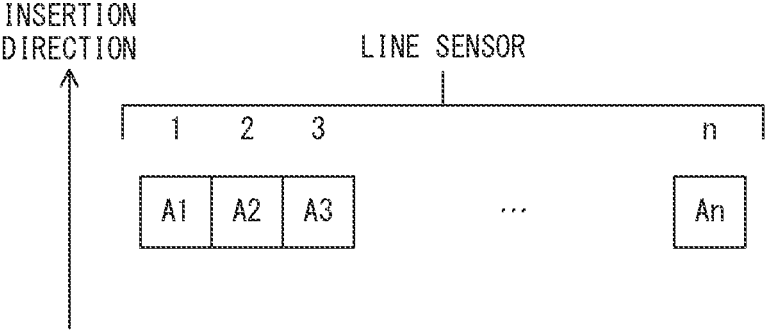
FIG. 7 is an explanatory view of a line sensor.

FIG. 7 is an explanatory view of the line sensor 133. The line sensor 133 can detect images corresponding to an "n" number of pixels in the direction orthogonal to the insertion direction of the sheet S at a time. Thus, for example, an "n" number of light receiving elements are arranged in series in the direction orthogonal to the insertion direction of the sheet S. In this embodiment, in the line sensor 133, the light receiving elements are arrayed so as to detect an image of 300 dpi.

The optical sensor 150 detects images corresponding to one line at a time. In this case, the optical sensor 150 performs only partial detection of irregularities on the surface of the sheet S. When the surface property of the sheet S is determined with detection results (reading results) for one line, deviation of detection results for every measurement position becomes larger. Thus, it is difficult to distinguish the surface property with detection results (reading results) corresponding to one line. That is, the reading results (detection results) of images corresponding to one line are not sufficient for identifying the surface property of the sheet S.

In this embodiment, the optical sensor 150 successively performs the reading operation for one line a plurality of times in the insertion direction of the sheet S. The information processing unit 160 connects the detection results obtained for every line in the insertion direction to create a detection result for the entire surface of the sheet S, and uses the detection result to grasp a tendency of the surface property of the sheet S. Thus, the optical sensor 150 dynamically performs the measurement under a state in which the sheet S is relatively moving.

Surface Property Information

The information processing unit 160 performs digital processing on the images detected by the optical sensor 150 to acquire detection values (luminance values) of the pixels. The detection values (luminance values) are accumulated in a memory provided inside the information processing unit 160. The information processing unit 160 acquires an adjacent pixel difference integrated value and a brightness as surface property information based on the detection values accumulated in the memory. The information processing unit 160 accumulates pieces of surface property information in the memory.

The adjacent pixel difference integrated value is a value obtained by integrating differences each given between detection values (luminance values) of pixels adjacent to each other in the direction of one line as described above, and serves as an indicator expressing the irregularities of the surface of the sheet S. When the detection values of the pixels (results of one sampling) are represented by "A1" to "An" in accordance with positions of the pixels in FIG. 7, an adjacent pixel difference integrated value "k" is expressed by the following expression.)

$$k=(A2-A1)+(A3-A2) \ldots +(An-A(n-1))$$

The brightness is an integrated value of the detection values of the pixels detected by the optical sensor 150, and is a parameter correlated with a reflectance (lightness) of the sheet S. For example, a transparent film made of a resin such as PET has a small amount of reflected light, and hence the brightness is measured as being low. The sheet S having a geometrical irregularity shape on a surface as in a case of an embossed paper sheet has a large luminance difference between adjacent pixels due to the irregularities, and hence the adjacent pixel difference integrated value is large. A recycled paper sheet has a non-uniform fiber orientation, and pulp fibers are shortened due to several recycling processes. As a result, the measured surface property tends to be rough. The coated paper sheet appears to have less irregularities due to the presence of the coating layer on the surface. As a result, the adjacent pixel difference integrated value tends to be small. As described above, the surface property of the sheet S is classified based on the detection values of the optical sensor 150, and the sheet can be classified based on classifications of the sheet used in the image forming apparatus 201.

Determination of Moving State of Sheet S

Figure 8:
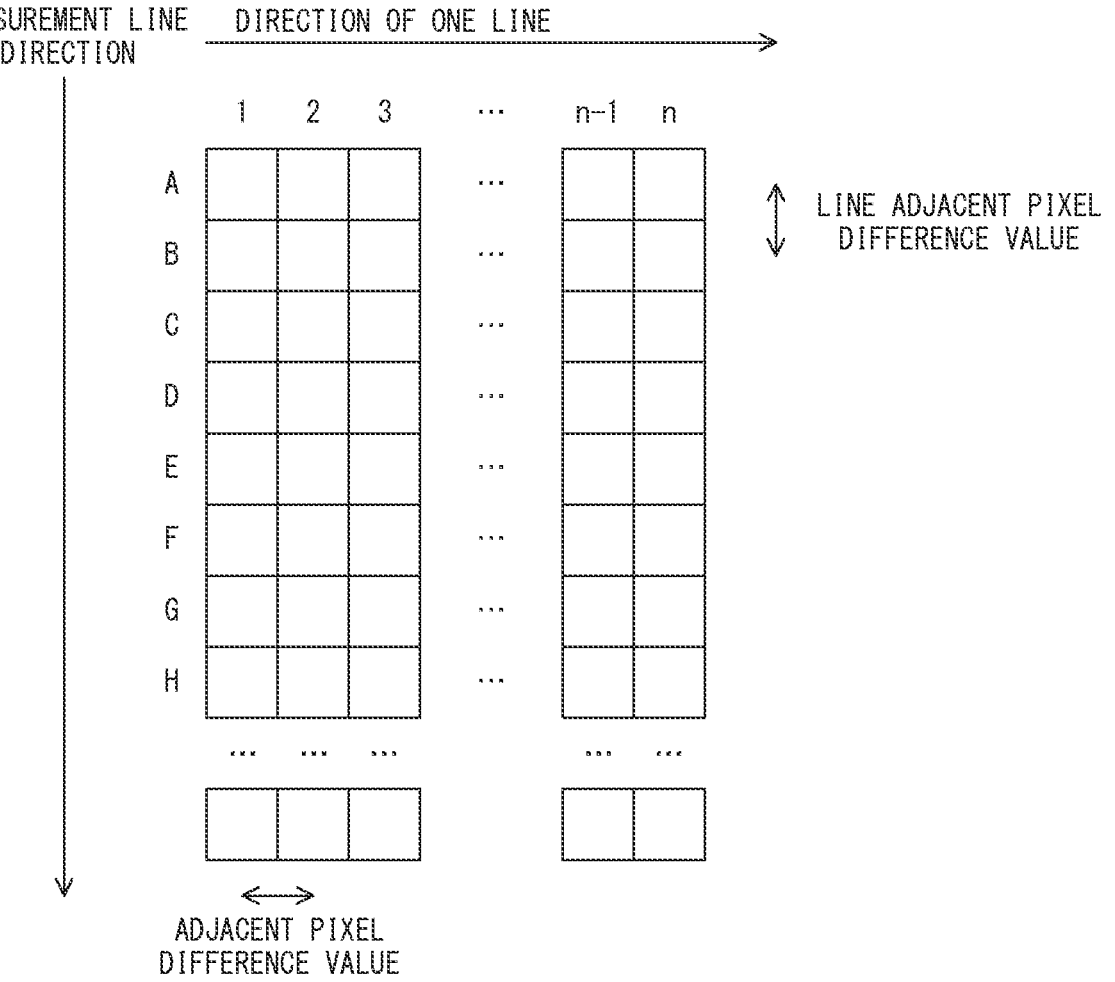
FIG. 8 is an explanatory view of line adjacent pixel difference integrated values.

In this embodiment, in order to determine that the sheet S is moving during measurement by the surface property measurement unit 103, line adjacent pixel difference integrated values are used as the surface property information. FIG. 8 is an explanatory view of the line adjacent pixel difference integrated values.

The line adjacent pixel difference integrated values are each an integrated value obtained by integrating difference values of detection values (luminance values) for pixels adjacent to each other between lines. As illustrated in FIG.

8, when there are given detection values A for the first line, detection values B for the second line, detection values C for the third line, and so on, line adjacent pixel difference integrated values "h" are expressed by the following expressions. The line adjacent pixel difference integrated values are calculated for every pixel in the direction of one line of FIG. 8.

$$h1=(A1-B1)+(A2-B2)+ \ldots +(An-Bn)$$

$$h2=(B1-C1)+(B2-C2)+ \ldots +(Bn-Cn)$$

The line adjacent pixel difference integrated values are each calculated through comparison of detection values (luminance values) of the same pixel in every line (same position in measurement line direction). Thus, when the detection position of the sheet S is the same in the first line and the second line, that is, under a state in which the sheet S is not being conveyed, the luminance values of the pixels of the first line and the second line are the same. Thus, a value of the line adjacent pixel difference integrated value h1 is approximately "0."

Figure 9A:
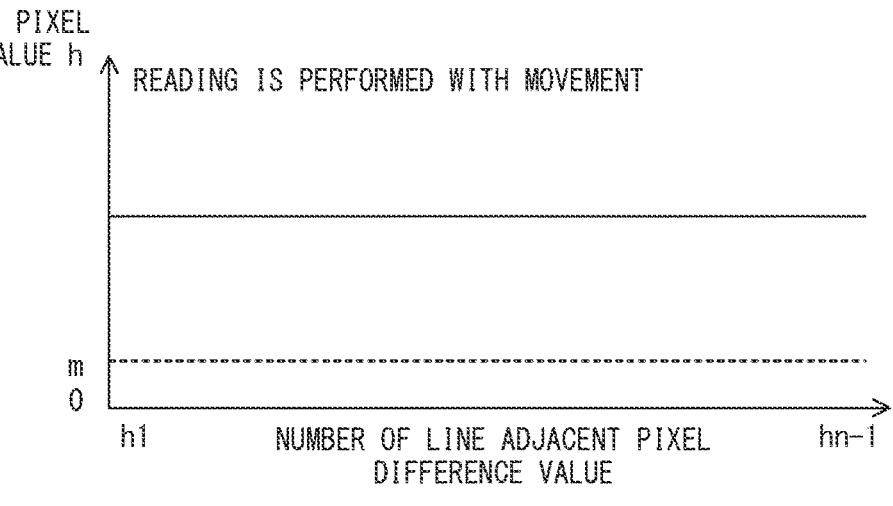
FIG. 9A, FIG. 9B, and FIG. 9C are property charts of line adjacent pixel difference integrated values.
Figure 9B:
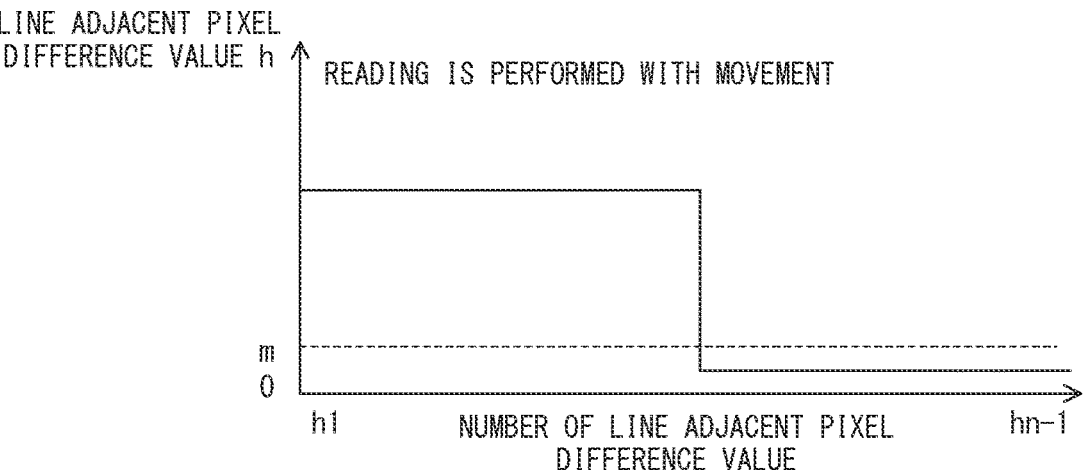
Figure 9C:
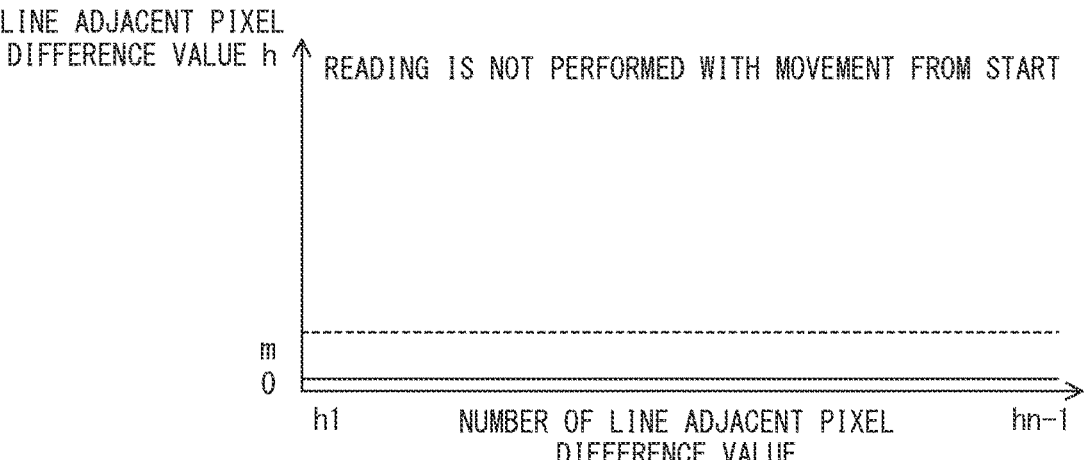

FIG. 9A, FIG. 9B, and FIG. 9C are property charts of the line adjacent pixel difference integrated values given when an "n" number of lines are measured. The horizontal axis represents pixels subjected to calculation of line adjacent pixel difference integrated values (h1 to hn−1), and the vertical axis represents a line adjacent pixel difference integrated value. A threshold value "m" is set in advance, and is, for example, a value for determination of whether or not detection is performed at the same position and under a state in which the sheet S is being conveyed. The threshold value "m" is, for example, a maximum value of the line adjacent pixel difference integrated value given when the same detection position (pixel) is measured.

FIG. 9A shows line adjacent pixel difference integrated values given when the sheet S moves during measurement of the surface property. In this case, the line adjacent pixel difference integrated values "h" are larger than the threshold value "m." FIG. 9B shows line adjacent pixel difference integrated values given when the sheet S stops moving in the middle during measurement of the surface property. In this case, the line adjacent pixel difference integrated values "h" based on the detection values detected under the state in which the sheet S stops moving are smaller than the threshold value "m." FIG. 9C shows line adjacent pixel difference integrated values given when the sheet S does not move during measurement of the surface property. In this case, the line adjacent pixel difference integrated values "h" are smaller than the threshold value "m." In this way, the moving state of the sheet S is determined based on the comparison between the line adjacent pixel difference integrated values and the threshold value "m."

Identification of Sheet Type

Figure 10:
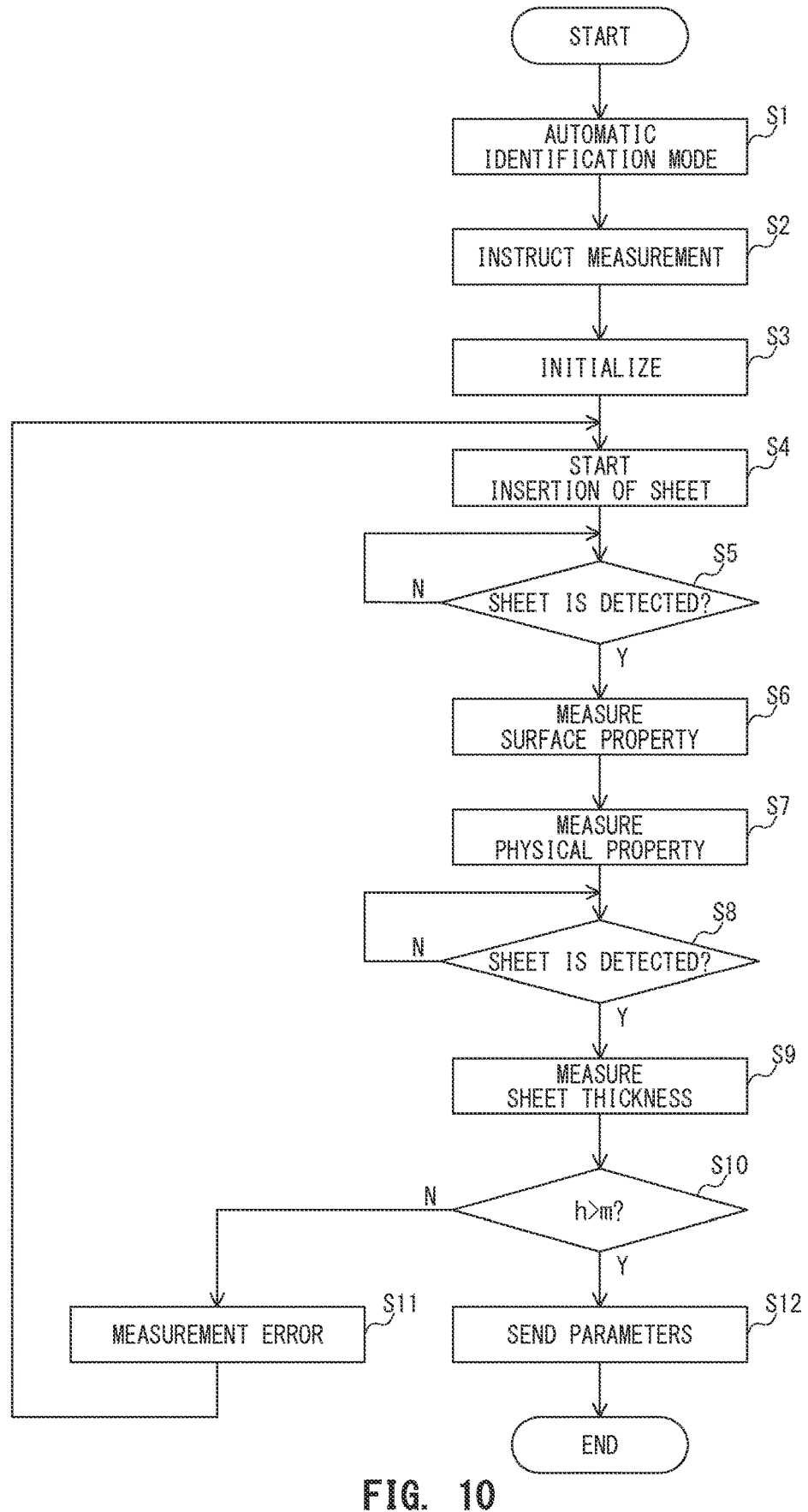
FIG. 10 is a flowchart for illustrating parameter acquisition processing for identifying a sheet type.
Figure 11:
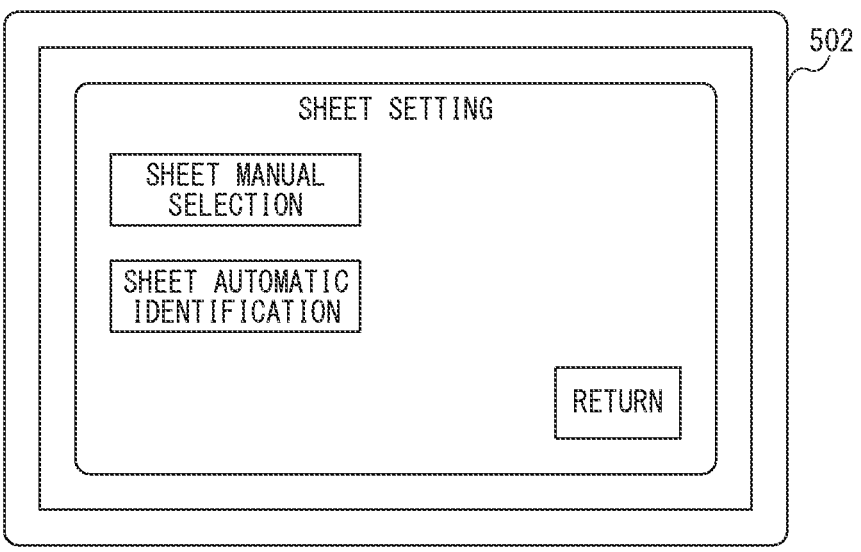
FIG. 11 is an illustrative view of a selection screen of identification processing for a sheet type.

FIG. 10 is a flowchart for illustrating parameter acquisition processing for identifying a sheet type of the sheet S. In this example, the number of lines to be measured is 600 lines. FIG. 11 is an illustrative view of a selection screen of identification processing for a sheet type of the sheet S. The selection screen is displayed on the display of the operation unit 502. The selection screen includes a "sheet manual selection" button and a "sheet automatic identification" button. The "sheet manual selection" button allows a user to manually input a type of the sheet S. The "sheet automatic identification" button allows the sheet property measurement device 100 to automatically select a type of the sheet S. In this embodiment, in response to selection of the "sheet automatic identification" button by a user from the selection screen with use of the operation unit 502, the selected content is input to the controller 400.

When the controller 400 acquires the information indicating that the "sheet automatic identification" button has been selected from the operation unit 502, the controller 400 sets an operation mode to an automatic identification mode for the sheet S (Step S1). When the operation mode has been set to the automatic identification mode, the controller 400 instructs measurement of the sheet S to the information processing unit 160 of the sheet property measurement device 100, to thereby notify that the operation mode has been shifted to the automatic identification mode for the sheet S (Step S2).

Figure 12:
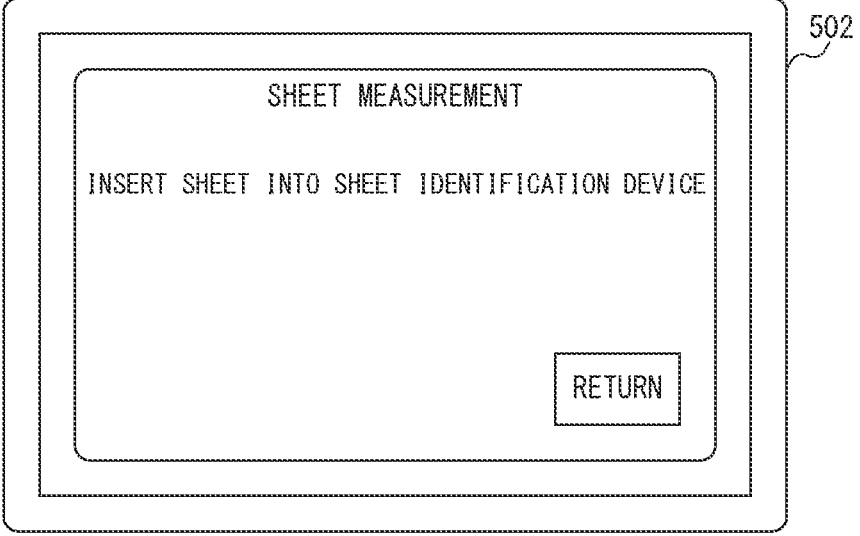
FIG. 12 is an illustrative view of an instruction screen.

The information processing unit 160 performs initialization processing for the mechanical physical property measurement unit 102 and the surface property measurement unit 103 to be ready for insertion of the sheet S (Step S3). After the information processing unit 160 has performed the initialization processing, the controller 400 displays on the display of the operation unit 502 an instruction screen for instructing the insertion of the sheet S. FIG. 12 is an illustrative view of the instruction screen for instructing the insertion of the sheet 5, which is to be displayed on the display of the operation unit 502. A user starts insertion of the sheet S into the groove portion 101 of the sheet property measurement device 100 in accordance with the instruction screen (Step S4).

When the sheet S is inserted into the groove portion 101, the information processing unit 160 waits until the upstream sheet sensor 104 detects the sheet S (Step S5: N). When the upstream sheet sensor 104 detects the sheet S (Step S5: Y), the information processing unit 160 regards the detection of the sheet S as a trigger (t=0) and starts measurement of a surface property of the sheet S with use of the surface property measurement unit 103 (optical sensor 150) after elapse of a predetermined time t1 (Step S6). The information processing unit 160 allows the optical sensor 150 to read the sheet S and sequentially acquires reading results (detection values) given by the optical sensor 150. The optical sensor 150 scans the conveyed sheet S a plurality of times at predetermined time intervals to measure the surface property of the sheet S. The information processing unit 160 performs the above-mentioned processing on the reading results (detection values) given by the optical sensor 150 to generate pieces of surface property information, and accumulates the pieces of surface property information in the memory provided inside.

Figure 13:
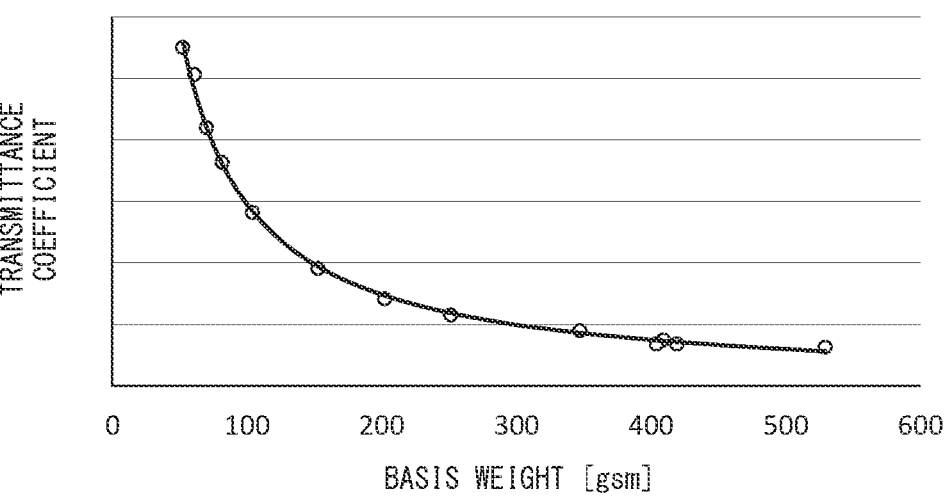
FIG. 13 is an explanatory graph of a relationship between a transmittance of ultrasonic waves and a basis weight.

The information processing unit 160 starts measurement of physical properties of the sheet S with use of the mechanical physical property measurement unit 102 after elapse of a predetermined time t2 (t2>t1) from the detection of the sheet S with use of the upstream sheet sensor 104 (Step S7), The information processing unit 160 measures a transmittance of the sheet S for ultrasonic waves with use of the ultrasonic wave sensor 120, converts the measurement values into pieces of basis weight information, and accumulates the pieces of basis weight information in the memory. FIG. 13 is an explanatory graph of a relationship between the transmittance of ultrasonic waves and the basis weight. The information processing unit 160 holds a conversion formula or a conversion table indicating such relationship between the transmittance of ultrasonic waves and the basis weight. The information processing unit 160 performs the conversion of the measurement value into the basis weight with use of such conversion formula or conversion table. As a result of such measurement of physical properties, the basis weight information of the sheet S is stored in the memory of the information processing unit 160. Further, the information processing unit 160 regards the detection of the sheet S with use of the upstream sheet sensor 104 as a trigger and waits for counts of pulse signals output from the sheet thickness sensor 140.

The information processing unit 160 waits until the downstream sheet sensor 105 detects the sheet S (Step S8: N). The downstream sheet sensor 105 detects the sheet S when the sheet S is inserted to reach the innermost abutment portion 108. When the downstream sheet sensor 105 has detected the sheet S (Step S8; Y), the information processing unit 160 acquires pulse signals being the measurement values from the sheet thickness sensor 140. The information processing unit 160 measures the sheet thicknesses of the sheet S based on the number of acquired pulse signals (pulse count) (Step S9). The sheet thicknesses of the sheet S are accumulated in the memory of the information processing unit 160. Further, when the downstream sheet sensor 105 has detected the sheet S, the information processing unit 160 stops reading of the sheet S with use of the optical sensor 150 of the surface property measurement unit 103.

Figure 14:
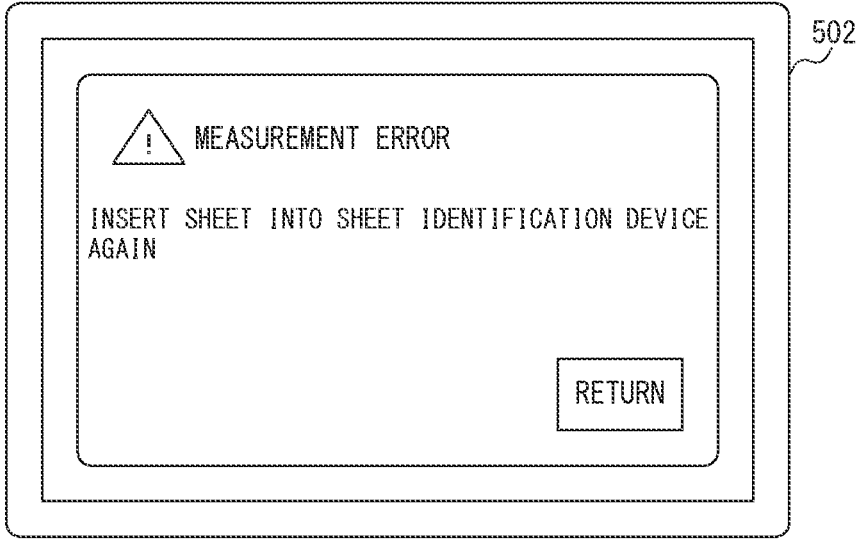
FIG. 14 is air illustrative view of an instruction screen.

The information processing unit 160 compares all the line adjacent pixel difference integrated values h1 to h599, which are accumulated as pieces of surface property information in the memory, with the threshold value "m" (Step S10). When at least one of the line adjacent pixel difference integrated values h1 to h599 is smaller than the threshold value "m" (Step S10: N), the information processing unit 160 determines that the sheet S has not moved (has not been conveyed) during the measurement with use of the surface property measurement unit 103. In this case, the information processing unit 160 determines that the surface property information of the sheet S has not been accurately acquired. The information processing unit 160 then discards all the pieces of information stored in the memory and sends error information (measurement error) to the controller 400 of the image forming apparatus 201 (Step S11). When the controller 400 acquires the error information, the controller 400 displays an instruction screen for instructing re-insertion of the sheet S on the display of the operation unit 502. FIG. 14 is an illustrative view of the instruction screen for instructing the re-insertion of the sheet S. The information processing unit 160 which has sent the error information performs the processing of Step S4 and subsequent steps again.

When all the line adjacent pixel difference integrated values h1 to h599 are larger than the threshold value "m" (Step S10: Y), the information processing unit 160 determines that the sheet S has moved (has been conveyed) during the measurement with use of the surface property measurement unit 103. In this case, the information processing unit 160 determines that measurement results have been accurately acquired. The information processing unit 160 sends termination information indicating that the processing has been normally terminated and also parameters such as the basis weight, the surface property information, and the sheet thickness stored in the memory to the controller 400 of the image forming apparatus 201 (Step S12). Those parameters are pieces of information for identifying a type of the sheet S.

Figures 15, 16:
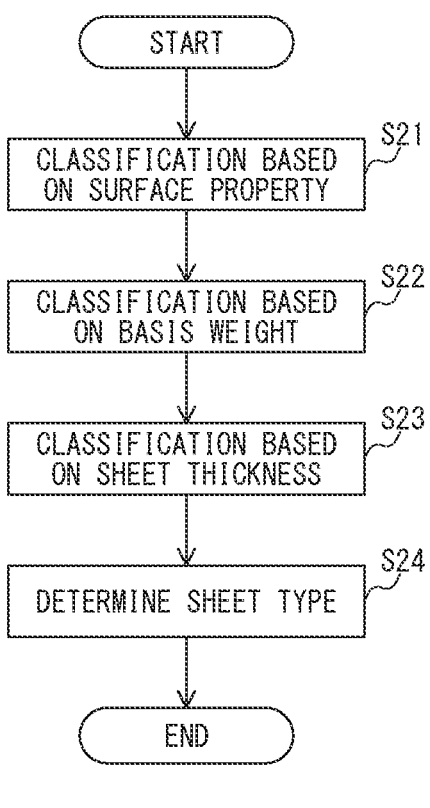
FIG. 15 is a flowchart for illustrating sheet type identification processing.
FIG. 16 is an explanatory diagram of classification of surface properties.

The controller 400 identifies a type of the sheet S based on the parameters having been acquired from the information processing unit 160. FIG. 15 is a flowchart for illustrating sheet type identification processing.

The controller 400 performs classification of a type of the sheet S based on the measurement results of the surface property of the sheet S (Step S21). FIG. 16 is an explanatory diagram of the classification of the surface property. In FIG. 16, surface properties of various types of sheets are measured and classified in advance with use of a matrix including the vertical axis representing the adjacent pixel difference integrated values and the horizontal axis representing the brightness as indices of a surface property. The controller 400 refers to the matrix in accordance with the pieces of surface property information (adjacent pixel difference integrated values and brightness) obtained from the detection values having been detected by the optical sensor 150 to classify a type of the sheet S.

The controller 400 adds the basis weight to the classification based on the surface property, to thereby determine a type of the sheet S (Step S22). Adding the basis weight to the parameters for identifying a sheet type enables the controller 400 to more finely classify the sheet S and identify a type of the sheet S. Further, the controller 400 uses the sheet thickness to improve the accuracy for estimation based on the basis weight (Step S23). A coated paper sheet is formed by applying, on a surface of a sheet such as a middle grade paper sheet, a coating material obtained by mixing a white pigment, such as clay (kaolin) or calcium carbonate, and an adhesive (binder) such as starch. The coated paper sheet has a higher density as compared to a printing plain paper sheet containing pulp as a main component, with the result that there is a large error in basis weight conversion using an ultrasonic wave transmittance coefficient-basis weight conversion formula. Thus, with use of the sheet thickness as a parameter for identification of a sheet type at the same time, the identification accuracy for the sheet S is improved. In particular, in order to identify a brand of the sheet S, it is advantageous to add the sheet thickness information. The controller 400 distinguishes a sheet type of the sheet S based on those parameters (Step S24).

Figure 17:
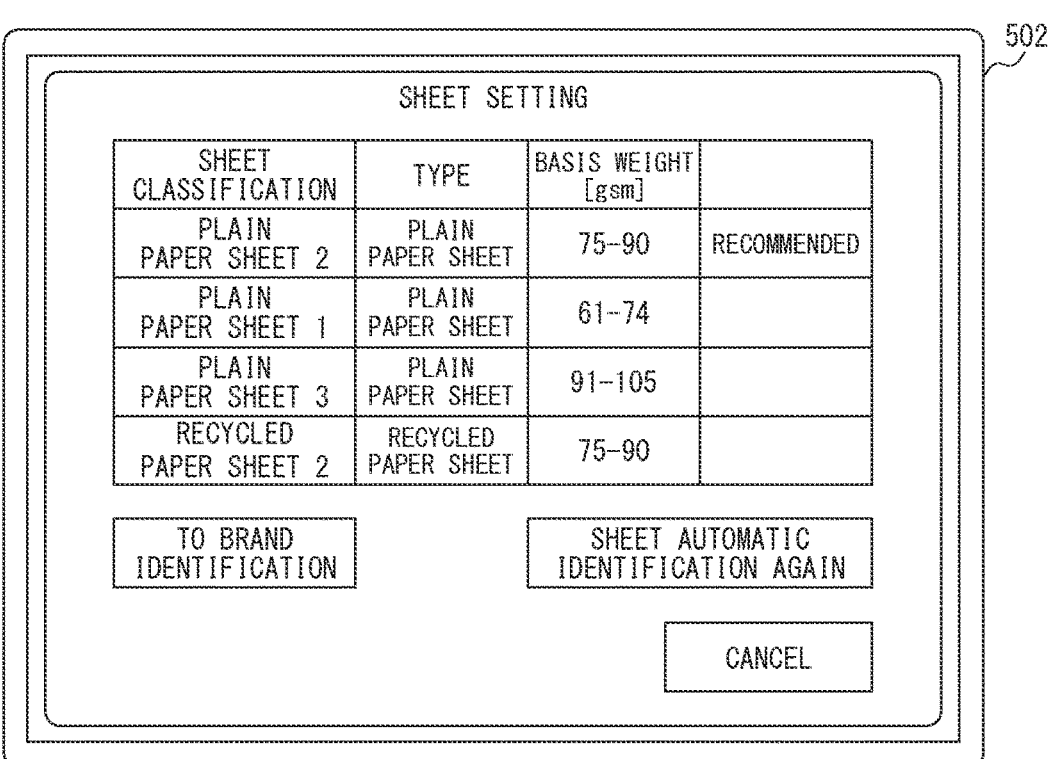
FIG. 17 is an illustrative view of a sheet selection screen after sheet type identification.
Figure 18:
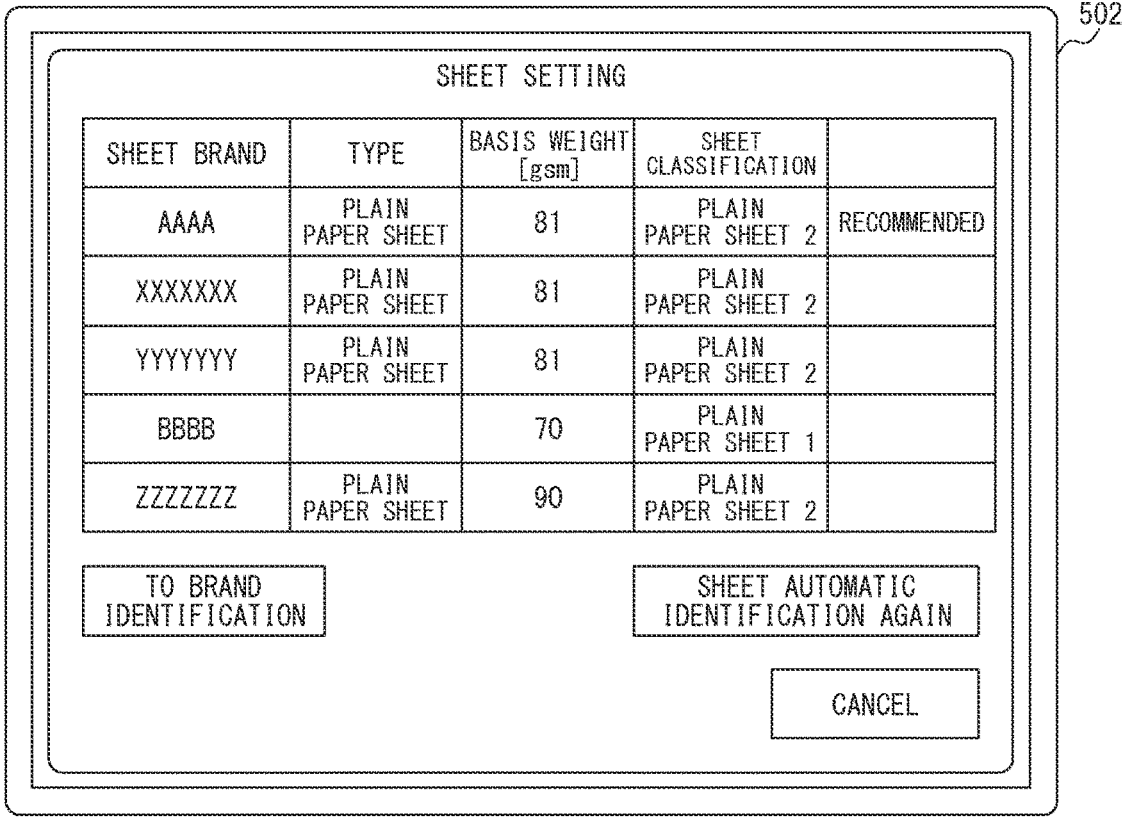
FIG. 18 is an illustrative view of a sheet selection screen after sheet type identification.

FIG. 17 and FIG. 18 are illustrative views of sheet selection screens given after identification of a sheet type. The sheet selection screens are displayed on the display of the operation unit 502. On the sheet selection screens, candidates of the sheet type determined in the processing of Step S24 are displayed. Through the sheet selection screen, a user can select a type of the sheet S to be actually used for printing from the sheet type determined in the processing of Step S24.

The sheet selection screen of FIG. 17 displays types of sheet settings which are selectable for every sheet classification set in advance in the image forming apparatus 201. There is a possibility that the sheet S is classified to a sheet classification different from a nominal basis weight due to, for example, variation in basis weight. Thus, on the sheet selection screen, classifications which are close to the detected sheet classification are also displayed. Further, the characters "recommended" are displayed in the row of the sheet type determined in the processing of Step S24. On the sheet selection screen of FIG. 18, a brand of a sheet is selectable. The sheet setting is performed through designation of a brand of a sheet. A user selects a sheet from a list of those sheet classifications or sheet brands through the operation unit 502 to assign the sheet setting to a sheet feeding stage. In this way, a type of the sheet S is accurately identified, and hence printing with correct image forming conditions can be performed.

FIG. 19 and FIG. 20 are illustrative tables of the sheet type database 402 stored in the memory 401 of the image forming apparatus 201. As described above, the sheet type database 402 includes pieces of information such as physical property values of various brands of sheets, optimum parameters of image forming conditions given at the time of image formation, whether or not to allow passage of a sheet in the image forming apparatus 201, and usable sheet feeding ports. The sheet type database 402 stores, in the form of being linked to brand information, as shown in FIG. 20, reference values of a surface property and a sheet thickness measured by the sheet property measurement device 100. The controller 400 refers to those values to determine, for example, candidates having the highest similarity, and displays the sheet selection screens of FIG. 17 and FIG. 18 on the display of the operation unit 502. In this way, a user can easily perform sheet setting.

When the sheet brand is determined, the sheet classification is also determined. In this way, the controller 400 uses the sheet type database of FIG. 19 to control image forming conditions of the image forming apparatus 201. Thus, it is possible to enable accurate sheet setting and formation of an image on the sheet S with an optimum quality by the image forming apparatus 201.

As described above, the sheet property measurement device 100 according to this embodiment determines whether or not the sheet S has moved (has been conveyed) during measurement of the surface property based on the line adjacent pixel difference integrated values calculated from the detection values given by the optical sensor 150. When the sheet S has not moved, the information processing unit 160 determines that accurate detection values have not been obtained, discards the acquired detection values, and notifies a user of occurrence of an error and re-measurement. Through such processing, the sheet property measurement device 100 can improve the accuracy of information (parameters) to be used for identification of a type of the sheet S. The image forming apparatus 201 which uses such parameters is improved in identification accuracy for the sheet S, thereby being capable of identifying a type of a sheet with high accuracy.

In this embodiment, the information processing unit 160 is provided in the sheet property measurement device 100, and the information processing unit 160 processes the measurement results given by the mechanical physical property measurement unit 102 and the surface property measurement unit 103 and sends the processed results to the controller 400 of the image forming apparatus 201. However, the processing of those measurement results may be performed directly by the controller 400. In this case, the functions of the information processing unit 160 are included in the controller 400. Further, the sheet property measurement device 100 sends the measurement results given by the mechanical physical property measurement unit 102 and the surface property measurement unit 103 directly to the controller 400.

In this embodiment, the image forming apparatus 201 includes the sheet type database 402. However, the sheet property measurement device 100 may include the sheet type database 402. Specification of a brand of the sheet S performed by the controller 400 is performed by the information processing unit 160 of the sheet property measurement device 100. Further, description has been made of the example in which the sheet detection by the upstream sheet sensor 104 is used as a trigger. However, it is also possible to use the sheet detection by the downstream sheet sensor 105 as a trigger. In this case, the surface property measurement is performed at the time of drawing out the sheet S from the sheet property measurement device 100. The encoder rotation of the sheet thickness sensor 140 may be detected in place of the encoder rotation of the downstream sheet sensor 105, and the zone of reading by the surface property measurement unit 130 may be determined based on the timing of the detection.

In the above, description has been made of the example in which the image forming conditions (control parameters) of the image forming apparatus 201 are determined through selection of a sheet classification and a sheet brand in accordance with characteristics detected by the sheet property measurement device 100. The sheet property measurement device 100 may be a sheet physical property measurement device, and may determine control parameters directly from measured feature amounts of a sheet. Further, the sheet type database 402 and the controller 400 may be provided on a cloud. In such a case, as long as the image forming apparatus 201 is connected to the cloud via a network, the latest sheet type setting information and identification algorithm can always be selected.

Modification Example

Figure 21:
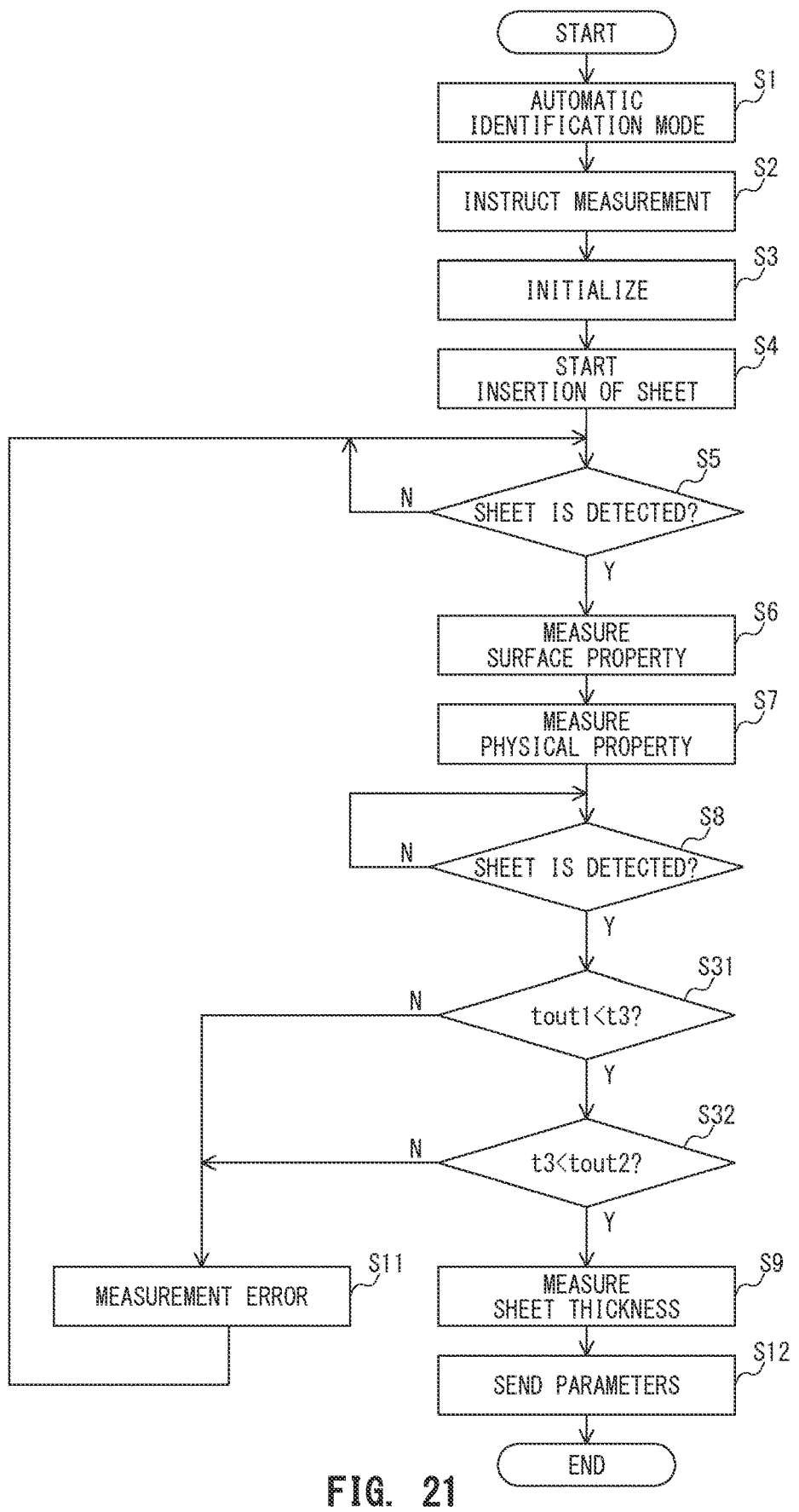
FIG. 21 is a flowchart for illustrating parameter acquisition processing for identifying a sheet type.
Figure 22:
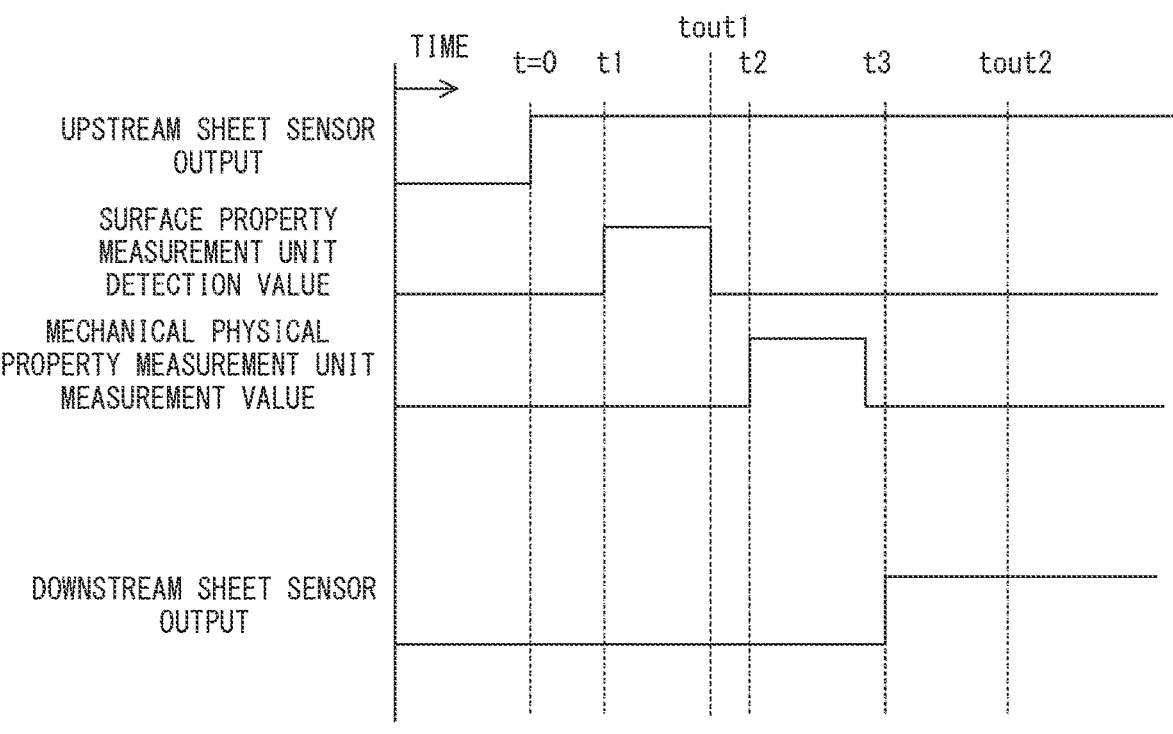
FIG. 22 is a timing chart at the time of acquiring parameters for identifying a sheet type.

The determination of movement (conveyance) of the sheet S may be performed in accordance with respective timings of detection of the sheet S by the upstream sheet sensor 104 and the downstream sheet sensor 105. FIG. 21 is a flowchart for illustrating parameter acquisition processing for identifying a sheet type of the sheet S in this case. The processing steps which are the same as those of the flowchart of FIG. 10 are denoted by the same step numbers. Description of the same processing steps is omitted. FIG. 22 is a timing chart at the time of acquiring parameters for identifying a sheet type of the sheet S.

When a user inserts the sheet S into the groove portion 101 of the sheet property measurement device 100, the upstream sheet sensor 104 detects the sheet S (Step S5: Y). The timing at which the upstream sheet sensor 104 detects the sheet S corresponds to a detection time t0. The timing at which the downstream sheet sensor 105 detects the sheet S is represented by elapsed time (detection time t3) from the detection time t0 (FIG. 22).

In response to the detection of the sheet S by the upstream sheet sensor 104 as a trigger, after elapse of the predetermined time t1, the surface property measurement unit 103 measures a surface property of the sheet S a plurality of times at predetermined time intervals (Step S6). In this way, detection values (luminance values) for every pixel are accumulated in the memory provided in the information processing unit 160. The information processing unit 160 generates pieces of surface property information from the accumulated detection values and accumulates the pieces of surface property information in the memory provided inside. The timing of terminating the measurement by the surface property measurement unit 103 (optical sensor 150) corresponds to a time tout1 after the detection time t0 (measurement termination time tout1).

After elapse of the predetermined time t2 from the detection of the sheet S by the upstream sheet sensor 104, the information processing unit 160 starts measurement of a physical property of the sheet S with use of the mechanical physical property measurement unit 102 (Step S7). The information processing unit 160 accumulates, in the memory, pieces of basis weight information acquired from measurement results given by the ultrasonic wave sensor 120. When it is desirable to also suppress variation in basis weight, the timing of terminating the measurement by the mechanical physical property measurement unit 102 may be set as the measurement termination time tout1.

The information processing unit 160 waits until the downstream sheet sensor 105 detects the sheet S (Step S8: N). When the downstream sheet sensor 105 has detected the sheet S (Step S8: Y), the information processing unit 160 determines whether or not the sheet S has moved (has been conveyed) during the measurement of the surface property based on the detection time t3 at which the downstream sheet sensor 105 has detected the sheet S and the measurement termination time tout1 (Step S31). When the detection time t3 is smaller than the measurement termination time tout1 (Step S31: N), it is assumed that the sheet S has moved to the abutment portion 108 before the termination of the measurement by the surface property measurement unit 103. In this case, the information processing unit 160 determines that the sheet S has moved to and stopped at the abutment portion 108 during the measurement of the surface property and hence the surface property information of the sheet S has not been accurately acquired. Thus, the information processing unit 160 discards all the pieces of information stored in the memory and sends error information to the controller 400 of the image forming apparatus 201 (Step S11).

When the detection time t3 is larger than the measurement termination time tout1 (Step S31: Y), the sheet S has moved to the abutment portion 108 after the termination of the measurement by the surface property measurement unit 103. In this case, the information processing unit 160 compares the detection time t3 with a timeout time tout2 (Step S32). The timeout time tout2 is an upper limit time from the detection of the sheet S by the upstream sheet sensor 104 to the detection of the sheet S by the downstream sheet sensor 105. The timeout time tout2 is set to be a time longer than a time taken from the detection of the sheet S by the upstream sheet sensor 104 to the detection of the sheet S by the downstream sheet sensor 105 when the sheet S is normally inserted. Based on this processing, determination is made on whether or not the timing at which the downstream sheet sensor 105 has detected the sheet S (detection time t3) is before the elapse of the timeout time tout2.

When the timeout time tout2 has elapsed (Step S32: N), the information processing unit 160 determines that the sheet S has not moved to the abutment portion 108 during the measurement of the surface property and hence the surface property information of the sheet S has not been accurately acquired. For example, this is the case in which all the plurality of reading results given by the surface property measurement unit 103 (optical sensor 150) do not change from (or all the plurality of reading results are substantially the same as) a reading result given at one location on the surface of the sheet S in the insertion direction. in this case, the information processing unit 160 discards all the pieces of information stored in the memory and sends error information (measurement error) to the controller 400 of the image forming apparatus 201 (Step S11). Here, the upstream sheet sensor 104 and the downstream sheet sensor 105 function as an output unit configured to output signals synchronized with the movement of the sheet S. When the timeout time tout2 has not elapsed (Step S32: Y), the information processing unit 160 determines that the sheet S has moved to the abutment portion 108 during the measurement of the surface property and hence the surface property information of the sheet S has been accurately acquired. In this case, the information processing unit 160 measures the sheet thickness (Step S9) and sends the parameters such as the basis weight, the surface property information, and the sheet thickness stored in the memory (Step S12).

Further, in order to determine whether or not all the plurality of reading results given by the surface property measurement unit 103 (optical sensor 150) do not change from the reading result given at one location on the surface of the sheet S in the insertion direction, the information processing unit 160 may make determination with use of the line adjacent pixel difference integrated values "h" and the threshold value "m" as described above based on the plurality of reading results acquired by the optical sensor 150 during the period from the detection time t0 to the elapse of the timeout time tout2.

As described above, determination can be made on whether or not the sheet S has moved (has been conveyed) during the measurement of the surface property based on the respective timings of detection of the sheet S by the upstream sheet sensor 104 and the downstream sheet sensor 105. When the sheet S has not moved, the information processing unit 160 determines that accurate detection values have not been acquired, discards the acquired detection values, and notifies a user of occurrence of an error and re-measurement. With such processing, the sheet property measurement device 100 improves the accuracy of the information (parameters) used for identifying a type of the sheet S. The image forming apparatus 201 using such parameters is improved in identification accuracy for the sheet S and is capable of identifying a type of a sheet with high accuracy.

As a configuration for detecting whether or not the sheet S has moved, there may be used a rotary body to be in contact with the sheet S to rotate in coordination with movement of the sheet S, and a known rotation detection sensor which detects whether or not the rotary body is rotating. The rotation detection sensor functions as an output unit configured to output signals synchronized with the movement of the sheet S. With such structure, when the rotation detection sensor detects that the rotary body is rotating, and a plurality of pieces of sampling data are output from the line sensor 133, the sheet property measurement device 100 performs detection of a sheet type based on the sampling data. When the rotation detection sensor detects that the rotary body is rotating, and only one piece of sampling data is output from the line sensor 133, the sheet property measurement device 100 does not perform the detection of a sheet type based on the sampling data. Also when the rotation detection sensor detects that the rotary body is rotating, and the sampling data is not output, the sheet property measurement device 100 does not perform the detection of a sheet type based on the sampling data. When the detection of a sheet type based on the sampling data is not performed, the sheet property measurement device 100 may inform a user of occurrence of a measurement error via the operation unit 502.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-032324, filed Mar. 3, 2022, which is hereby incorporated by reference herein in its entirety.

What is claimed is:

1. An identification apparatus having, in an insertion direction in which a sheet is inserted, one end side that includes an opening into which the sheet is inserted and another end side that includes an abutment portion against which the sheet abuts, the identification apparatus comprising:

a reading sensor configured to read a surface of the sheet; and a display portion, wherein, in a case in which the surface of the sheet is read by the reading sensor in a state in which the sheet inserted through the opening is not moving, a message indicating that a reading result is abnormal is displayed on the display portion.

2. The identification apparatus of claim 1, wherein an indication instructing re-insertion of the sheet is displayed on the display portion in the state in which the sheet inserted through the opening is not moving.

3. The identification apparatus of claim 1, wherein, in the case in which the surface of the sheet is read by the reading sensor in the state in which the sheet inserted through the opening is not moving, the reading result is discarded.

4. The identification apparatus of claim 1, wherein the reading sensor is an optical sensor configured to perform sequential reading of the sheet one line at a time multiple times, and wherein the identification apparatus further comprising a determination unit configured to determine whether the sheet inserted from the opening is moving or not based on a reading result for pixels adjacent to each other between lines from a result of the sequential reading.

5. The identification apparatus of claim 4, wherein the determination unit is configured to:

calculate integrated values of differences of the reading result for pixels adjacent to each other between lines from the result of the sequential reading, and determine whether the sheet inserted from the opening is moving or not based on the calculated integrated values.

6. The identification apparatus of claim 5, wherein the determination unit is configured to:

calculate integrated values of differences of luminance values for pixels adjacent to each other between lines from the result of the sequential reading, and determine whether the sheet inserted from the opening is moving or not based on the calculated integrated values.

7. The identification apparatus of claim 5, wherein the determination unit is configured to determine that the sheet inserted from the opening is not moving in a case in which the integrated value is less than a predetermined threshold value.

8. The identification apparatus of claim 4, further comprising:

a first detection unit, located on an upstream side of the reading sensor with respect to the insertion direction, configured to detect the sheet inserted into the opening; and a second detection unit, located on a downstream side of the reading sensor in the insertion direction, configured to detect the sheet inserted into the opening, wherein the determination unit is configured to determine whether the sheet inserted from the opening is moving or not based on a timing at which the first detection unit detects the sheet and a timing at which the second detection unit detects the sheet.

9. The identification apparatus of claim 8, wherein the determination unit is configured to determine that the sheet inserted from the opening is not moving in a case in which the second detection unit detects the sheet before completion of reading by the reading sensor.

10. The identification apparatus of claim 8, wherein the determination unit is configured to determine that the sheet inserted from the opening is not moving in a case in which the second detection unit detects the sheet after elapse of an upper limit time for a period from detection of the sheet by the first detection unit to detection of the sheet by the second detection unit.

11. The identification apparatus of claim 1, further comprising a physical property measurement portion configured to measure a basis weight of the sheet, wherein a type of the sheet is identified based on the reading result by the reading sensor in a case in which the sheet is moving and a measurement result measured by the physical property measurement portion.

12. The identification apparatus of claim 1, further comprising a physical property measurement portion configured to measure a sheet thickness of the sheet, wherein a type of the sheet is identified based on the reading result by the reading sensor in a case in which the sheet is moving and a measurement result measured by the physical property measurement portion.

13. The identification apparatus of claim 1, further comprising a first physical property measurement portion configured to measure a basis weight of the sheet and a second physical property measurement portion configured to measure a sheet thickness of the sheet, wherein a type of the sheet is identified based on the reading result by the reading sensor in a case in which the sheet is moving, a measurement result measured by the first physical property measurement portion, and a measurement result measured by the second physical property measurement portion.

14. An image forming apparatus, comprising:

an image forming portion configured to form an image on a sheet;

the identification apparatus, configured to identify a type of the sheet, of claim 1; and a control unit configured to set an operation condition of the image forming portion based on the type of the sheet identified by the identification apparatus.

\* \* \* \* \*